(12) United States Patent
Kauffmann

(10) Patent No.: US 9,862,284 B2
(45) Date of Patent: Jan. 9, 2018

(54) POP UP ELECTRICAL APPARATUS WITH WIRELESS CHARGING COMPONENT FOR ELECTRIC VEHICLES

(71) Applicant: Alan Kauffmann, Bothell, WA (US)

(72) Inventor: Alan Kauffmann, Bothell, WA (US)

( * ) Notice: Subject to any disclaimer, the term of this patent is extended or adjusted under 35 U.S.C. 154(b) by 0 days.

(21) Appl. No.: 15/017,347

(22) Filed: Feb. 5, 2016

(65) Prior Publication Data

US 2016/0207406 A1    Jul. 21, 2016

Related U.S. Application Data

(63) Continuation-in-part of application No. 14/977,157, filed on Dec. 21, 2015, and a continuation of application No. 13/657,790, filed on Oct. 22, 2012, now Pat. No. 9,543,769.

(51) Int. Cl.
*B60L 11/18* (2006.01)
*H02J 7/00* (2006.01)

(52) U.S. Cl.
CPC ......... *B60L 11/182* (2013.01); *B60L 11/1824* (2013.01); *Y02T 10/7005* (2013.01)

(58) Field of Classification Search
CPC .............................. H02J 7/0042; H05K 5/069
USPC .................................................. 320/109, 108
See application file for complete search history.

(56) References Cited

U.S. PATENT DOCUMENTS

| | | | | |
|---|---|---|---|---|
| 6,290,518 B1* | 9/2001 | Byrne | .................... | H02G 3/185 16/224 |
| 8,348,683 B2* | 1/2013 | Row | ........................ | H02G 3/12 174/66 |
| 9,543,769 B2* | 1/2017 | Kauffmann | ............ | H05K 5/069 |
| 2010/0277121 A1* | 11/2010 | Hall | ....................... | B60L 11/182 320/108 |
| 2013/0320923 A1* | 12/2013 | Hooker | ................. | B60L 3/0046 320/109 |

* cited by examiner

*Primary Examiner* — M'Baye Diao
(74) *Attorney, Agent, or Firm* — Emerson Thomson Bennett, LLC; Roger D. Emerson; Andrew S. Curfman

(57) ABSTRACT

An electrical supply apparatus including a containment unit with a bottom, at least one side wall forming an enclosure with an open top; a tower extendable and retractable from the containment unit and a charging unit attached to the tower which, in preferred embodiments, is a wireless charging component provided in a cover, for charging electric vehicles, and particularly to induce optimal current transfer to a receiving component without requiring a corresponding extension of the receiving component out of an electric vehicle and featuring a flexible bellows having an upper edge and a lower edge, wherein said upper edge is continuously affixed about said cover and a lower edge is continuously attached to a flange forming the bottom of the crown ring such that said bellows provides a watertight barrier preventing contaminants from entering an area under said cover.

17 Claims, 21 Drawing Sheets

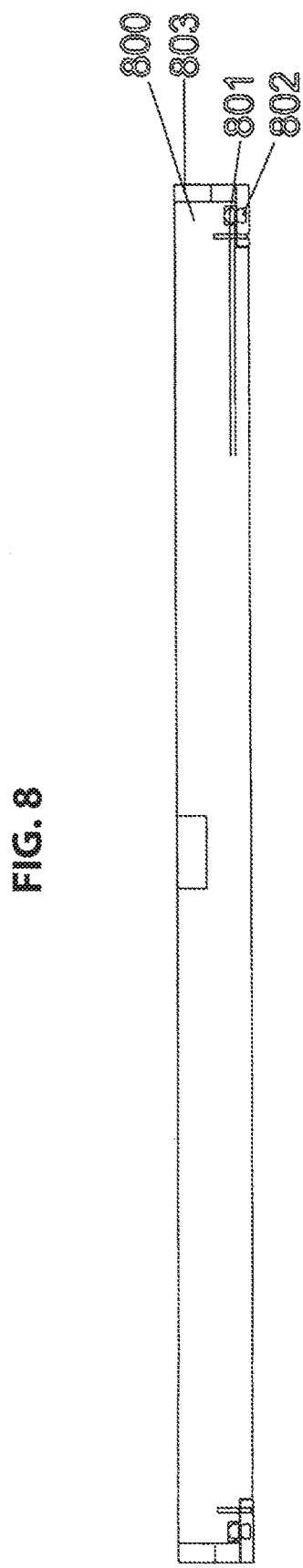

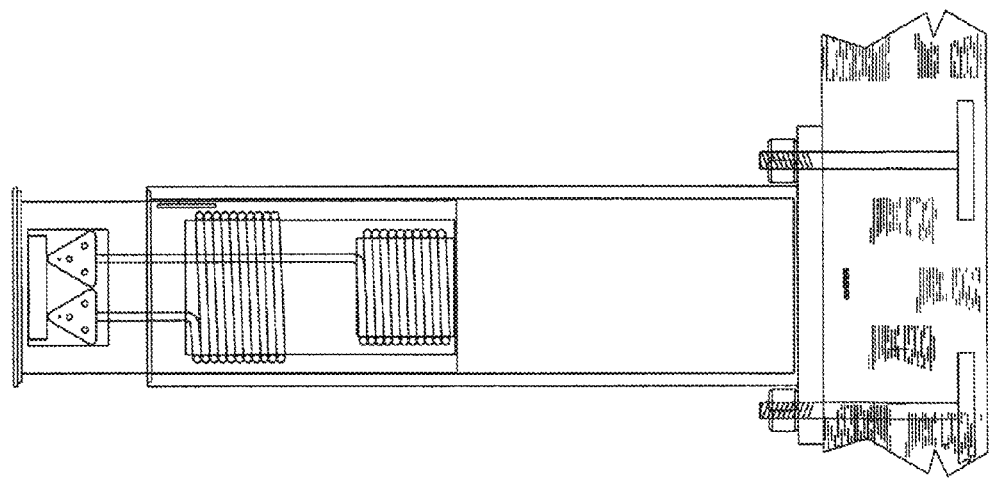
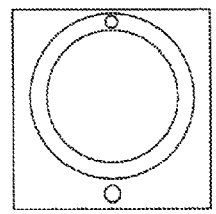
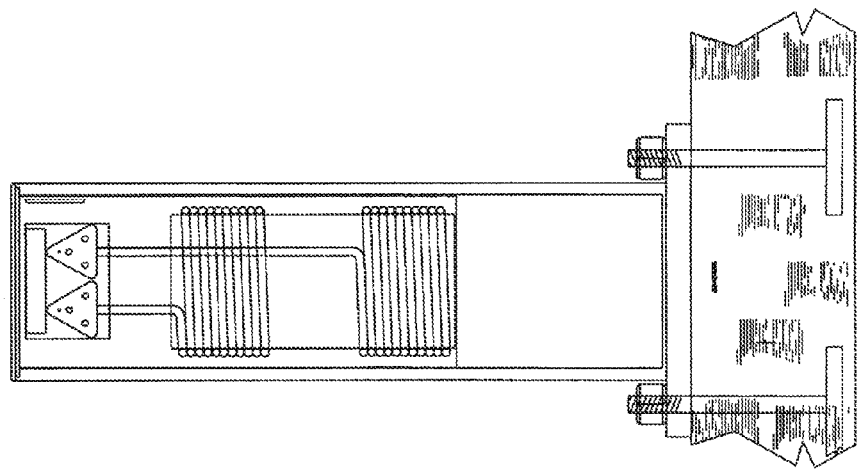

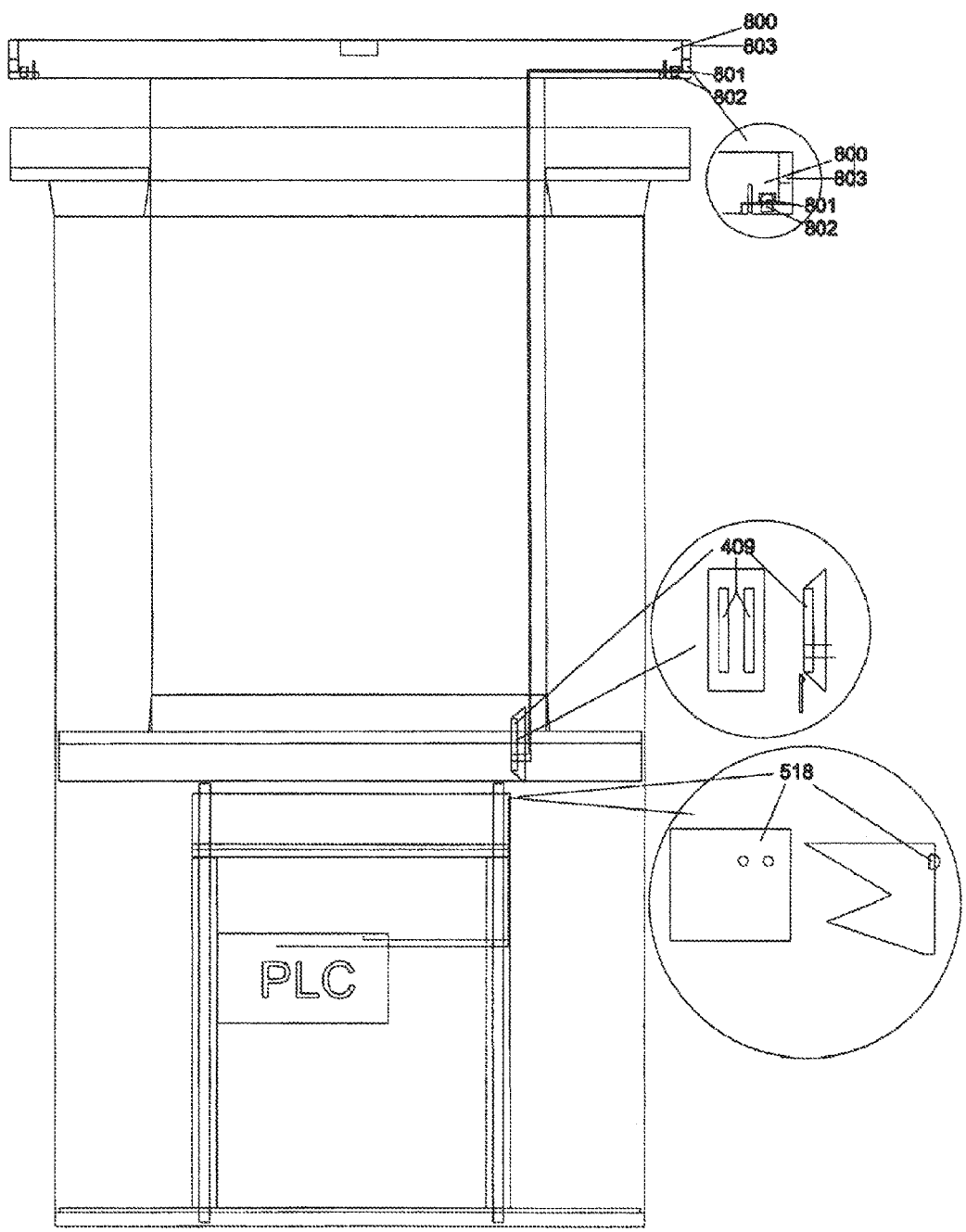

POP UP ELECTRICAL APPARATUS WITH WIRELESS CHARGING COMPONENT FOR ELECTRIC VEHICLES

CROSS REFERENCE TO RELATED APPLICATION

This application is a continuation in part of application Ser. No. 13/657,790 filed on 2012 Oct. 22 which is continuation of application of application Ser. No. 14/977,157 filed on 2015 Dec. 21 which is a continuation of application Ser. No. 13/657,790 filed on 2012 Oct. 22.

FIELD OF THE INVENTION

This invention relates generally to electrical outlets and receptacles or data outlets and receptacles, including those which are usually mounted in walls and other vertical surfaces and are functionally adapted to receive electrical plugs to supply electric current to various electrical appliances and devices or to receive data plugs and connectors to supply data. More particularly, it relates to an electrical outlet and receptacle or data assembly which can be opened from and retracted to a position below a horizontal surface, specifically a walking surface, to hide and secure the receptacle when such is desired or required. It also will provide an environmentally or weather secure way to hide and protect the device when not in use. Additionally, it could be used as a secure, EV pop up charging station.

BACKGROUND OF THE INVENTION

It has long been recognized that water and other liquids, or dirt and other debris can easily enter electrical outlets and receptacles and cause electrical shorts. This is particularly true where, for example, an electrical outlet is mounted to a horizontal surface, particularly when the device is located outside. For that reason, such outlets, when placed for industrial use or application, are located either vertically above or below the horizontal surface of a walkway or other ambulatory surface. Any water or liquid situated on that horizontal surface would be incapable of penetrating the outlet located above the horizontal surface when the outlet is mounted vertically. In the case of a walkway or other ambulatory surface where there is no physical ability to place such an outlet or receptacle above the ground or walkway, simply because there is no wall in which to locate the receptacle, the only option is to provide a long cord with a receptacle at the end to provide electricity or to provide a box that is permanently raised above ground level. This is inconvenient, is hazardous, and is not visually appealing. Such conventional placement of the electrical outlets, receptacles and cords limits the availability of electricity and the ease of access. Additionally, such placement of outlets using cords can create fire hazards, can block walkways, can cause liability due to the cords lying on the ground and does not provide for easy access to electricity. Cords can be cut or damaged to the point of causing a short circuit, and subsequently, possible damage to hardware plugged into them. It can also result in a violation of the National Electrical Code.

With the increased use of electric cars there has been an increased desire to have easy yet secure access to electricity. This is currently being done in the United States with charging stations. Unfortunately, however, drawbacks emanating from exposure of charging cables, wires and other components to inclement weather, theft and vandalism and a convenient means for payment and orienting the charging component with the electric vehicle receiving component persist. Therefore, there persists a need for an electric vehicle charging system which provides a way to install a secure and protected charging station, including its charging cables and components, when not in use while also providing ready access to users of electric vehicles, as well as, a ready means to electronically pay for the service and the electricity.

SUMMARY OF THE INVENTION

The present invention addresses such and other problems by providing an extendable, pop up electrical charging unit and receptacle that can be flush mounted with the adjacent surface. The electric vehicle supply apparatus of the present invention further provides a system which is water and weather proof and can therefore be safely used in an environment where water or other liquids may, from time to time, be exposed to it and which is in full compliance with the National Electrical Code. A further object of this invention is provided in an apparatus that is easily and conveniently extended and retracted into position and that provides a safe, secure and reliable means of providing electricity and/or data, with a particular view toward providing an apparatus that can be used as a secure, EV charging station.

This invention relates to improvements in under floor electrical access boxes and more particularly to in ground electrical access boxes with an above ground detachable tower containing limited receptacles with no weather protection when in use. Previously, the tower had to be disconnected from the in-ground box and it needed to be stored and therefore could be stolen or misplaced. Furthermore, when the tower was installed the box cover needed to be stored and thus was also very easily misplaced.

The principal objective of the present invention is to provide readily available access to electrical components that when not in use are stored beneath the surface in a secure position and when needed will pop up out of the surface to which it is installed be it vertical or horizontal ready to use and are water tight and weather proof when in use and when stored. The construction of the invention may be accomplished by use of conventional materials commonly used in construction of in ground types of enclosures. The preferred materials used in this embodiment of the invention, is carbon fiber composite construction, although many other commonly used materials are acceptable. The electrical supply apparatus is assembled in a simplified manner to make installation quick and easy which makes it less expensive to install. It was also the objective of this inventor that the one installing the apparatus be considered and so access to all connections are accomplished in the easiest manner possible.

Preferred embodiments of the present invention include an installation in which the components for charging stations for electric vehicles are installed inside the electrical supply apparatus configuration. The components including the charging cables are protected inside the containment unit providing an advantage of securing charging cables to thereby safeguard them against vandalism and theft. A preferred embodiment of the present invention provides an electrical supply apparatus with a wireless charging unit for an electric vehicle, which includes a containment unit having a bottom, at least one side wall, an open top, a tower having at least one side wall, wherein the tower is extendably and retractably moveable into the containment unit, and also includes an electric vehicle wireless charging component installed on or in the tower.

The electric vehicle charging unit of the present invention preferably includes an insulating, shielded matrix, wherein the electric vehicle wireless charging component is configured and affixed to the tower in a manner whereby it may be extended to an orientation proximate to the receiving component to thereby activate induction of wireless charging of the electric vehicle. In preferred embodiments of the present invention, the wireless charging component comprises one or more induction antenna. In particularly preferred embodiments, the wireless charging component is connected to the cover or comprises the cover.

The tower of the electrical supply apparatus of the present invention may be moved manually or with a power assist. Preferred embodiments employ a power assist to extend the tower out of the containment unit to thereby adaptively orient the wireless charging unit so as to optimize proximity to the receiving component for inducing wireless charging of said electric vehicle. It may be further provided with a mechanism to contact an EV surface proximate to the receiving component. The pop up apparatus is preferably equipped with communication devices which communication with corresponding communication devices onboard the electric vehicle and thereby give positioning information of where to locate the vehicle in relationship to the proper alignment of the ground antenna and the onboard antenna of the electric vehicle to be charged. And in addition, information is shared to properly select the charging parameters for the particular electric vehicle. At the proper time the pop up apparatus is instructed to extend the tower toward said electric vehicle and orient the charging antenna to within at least four inches (10 cm) in the preferred embodiment of this invention it is possible to place the charging antenna against the surface of the electric vehicle, or any preset distance desirable to accommodate any manufacturers specifications for a particular induction charging antenna to achieve the most efficient charge possible.

The containment unit of the present invention is preferably installed in a flush surface configuration such that the upper surface of the tower cover is flush with the adjacent surface to which it is installed and wherein the power assist extends the tower out of the containment unit to adaptively orient the induction charging component so as to optimize proximity to the receiving component for inducing wireless charging of the electric vehicle, and wherein said power assist retracts the cover into said containment unit to the stored, flush position upon occurrence of a predetermined condition for charge termination. Such predetermined conditions may include completion of charge, termination by user, a safety system alert, and power surge above a threshold set point.

Preferred embodiments of the present invention further comprise a transceiver for wireless transceiving and processing of data signals for communicating with the electric vehicle or a user of the electrical supply apparatus. Data signals transceived in such communications may comprise a wireless identification code to access the electric vehicle charging unit, global positioning system (GPS) data signal processing to locate and for activating the extendable tower and the charging component it houses. In particularly preferred embodiments, such data signal communications enable alignment of the vehicle with the electrical supply apparatus of the present invention so as to optimize proximity to the receiving component for inducing wireless charging of and electric vehicle. A yet further feature of preferred embodiments provides for processing of data signals enabling electronic payment for charging an electric vehicle.

Alternative embodiments of the present invention further include a bellows between the cover and a flange at the top of the containment unit and providing a heater within the containment unit.

As used herein, the term "tower" refers to a variously sized and shaped, vertically, essentially hollow structure sized and configured to house in secure orientation, components of an electrical component, outlet, or in preferred embodiments, an electric vehicle charging unit, which is preferably a wireless induction charging antenna, in a configuration enabling movement of the tower, with the charging unit, to extend out of and retract into, the containment unit. Thus, the term "tower" as described and claimed herein refers to a variably sized and shaped structure suitable for its charging or other purpose, which is adaptable to the electrical component it houses, topography of the environment or location where it is installed and particular use of or application. Accordingly, although the present invention illustrates and describes a generally cylindrical shape, the tower may be configured in numerous alternative configurations, such as, for example and without limitation, square, rectangular, oblong, oval, or any number of geometric or irregular shapes.

Materials from which charging stations are conventionally constructed are typically light gauge metals with low tensile strength prone to damage or destruction. The present invention is preferably made from carbon fiber and other fibers assembled in a composite matrix rendering a highly durable containment unit. Stowage of the electric vehicle (EV) charging station components, including the cables, inside the containment unit maintains them in safe and secure condition. A further feature of the present invention is access to the charging cables and electronic devices to monitor the charging process through process of a user's credit card or payment application which, together with verification means associated with other identification and authentication systems provided through reading devices and verification or codes and personal information, provides round-the-clock facile and secure access.

Preferred embodiments of the present invention employ a wireless contact code to qualify an EV user to locate and activate the extendable tower and thereby access an EV charging unit.

A yet further feature of preferred embodiments of the present invention provides a containment unit for electrical supply apparatus with an EV induction charging unit having an induction antenna provided in an insulating matrix configured for charging a receiving component in an EV. Particularly preferred embodiments incorporate the EV induction charging unit in a cover of the extendable tower.

The present invention further provides an extension mechanism to thereby adaptively orient the EV induction charging unit to place the EV induction charging unit proximate to or in contact with a surface of the EV so as to align with the receiving unit of the EV. A yet further feature of the present invention is a mechanism to adaptively orient the EV charging unit in a position adjustable to clearance of the lower surface of the EV. The extendable tower with the inductive charging unit may be moved via power assist between the extended and retracted positions or manually.

As used herein, "power assist" is defined as a procedure or mechanism for supplementing or replacing the manual effort needed to operate a device or system, often by hydraulic, electrical, or mechanical means.

The present electrical supply apparatus may further comprise a bellows between the cover and the flange at the top of the containment unit. Embodiments of the apparatus of the present invention may further include a heater in the top of the extendable tower or the cover.

According to the present invention this body of construction consists of two major assemblies. The containment unit which is extremely strong and serves as the platform to install electrical devices in the ground or above ground or in a wall or other vertical surfaces. It is a weather proof structure for connections, motor and other electrical devices needed to operate this invention.

The present invention further includes an extendable/recessable tower capable of moving in and out of the container unit, and contains various components and connections as may be needed for the particular installation. The tower may be moved in and out of the containment unit with a power assist or manually. Manual movement entails the steps of removing the cover, placing and preferable latching the extendable tower in a suitable position relative to its use, and releasing it into a recessed position back below surface level, and replacing the cover. In preferred embodiments, the extendable tower is activated by a power assist mechanism. In a particularly preferred embodiment, motor and pulley assemblies are employed to drive the extendable tower into a use and recessed, stored position. Manual operations must a latching mechanism to secure the cover in closed and open positions It is an object of this invention to facilitate many and varied applications. The apparatus of the present invention may be installed below the surface or above the surface depending on the projected application. It provides a hidden container for electrical outlets which, when needed, pop up out of the containment unit ready for use. The components are maintained in a water proof environment even when in use and thus are safe and compliant with electrical codes.

Embodiments employing an above ground installation enable diverse outdoor applications of the present invention. The outer container provides a durable and waterproof shell capable of withstanding rugged conditions and impacts. Thus, the apparatus according to the present invention may be used in all kinds of inclement weather and environments. For example, construction with high tensile strength materials provide durable containers which are can withstand large loads without sustaining damage. Parking lots, malls, convention centers, military bases, airports and airbases are just a few of the places where this type of box is useful.

The weather proof and durable apparatus of the present invention may further be installed on marine floating docks and fixed piers to supply shore power for ships and boats, and may be employed in residential, as well as, commercial applications, and be provided in permanent, mounted position or be portable. Not all possible uses are mentioned, but one can see the many and varied possible modifications, permutations, and applications for this tower moveably secured inside the containment box providing secure storage in the retracted or stored position and ready extension to access electrical components and data ports provided by the electrical supply apparatus of the present invention.

Particularly preferred embodiments of the present invention are contemplated for use as an electric vehicle (EV) charging station.

BRIEF DESCRIPTION OF THE DRAWINGS

The above and other objects of the present invention will become readily apparent by reference to the following detailed description when considered in conjunction with the accompanying drawings wherein:

FIG. 8 is a side view of the cover of a preferred embodiment of the electrical supply apparatus of the present invention.

FIG. 12A is the above ground pedestal mount of an EV Charging station in the stored position.

FIG. 12B is the above ground pedestal mount of an EV Charging station in the full use position.

FIG. 13 is a side view of a preferred embodiment of the electrical supply apparatus of the present invention showing detail of the safety system components.

DETAILED DESCRIPTION OF THE PREFERRED EMBODIMENTS

Figure 1A:
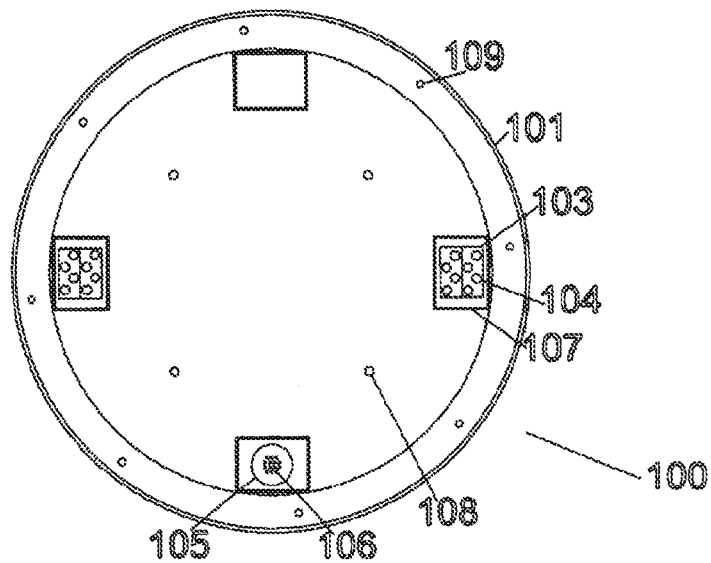
FIG. 1A is an elevated view of the containment box of a preferred embodiment of the electrical supply apparatus of the present invention.

Electrical connections are used in everyday applications from house hold appliances to industrial machinery and now to hybrid and fully electric vehicles. Access to these electrical connections varies depending on location and need. Typically, these electrical connections are in plain sight: on walls, ceilings, extension cords with multi-prong plugs and counter tops. They can also be found in floors, at or below floor level, hanging down from the ceiling, and installed into a ceiling. Connections are also used extensively outside mounted in the same manner with water resistant covers to protect from shock hazards and to protect against the environment.

Many spaces, both outside and inside, have areas or rooms that have intermittent and/or permanent need for electrical connections of both low and high voltage options, in some instances for example, in the middle of a large room or outside for charging stations and the like. These spaces may call for there to be an electrical connection without the outlet being obtrusive in nature due to having spatial and/or visual restrictions and still be easily accessible.

The present embodiment of the electrical supply apparatus relates to improvements to subfloor or sub-ground electrical access boxes, specifically to in-ground electrical access boxes and an above ground detachable tower containing limited receptacles with no weather protection. Currently, when the tower is disconnected from the in-ground box extra space is needed to store the tower. This can cause the detachable tower to be lost or damaged. The current invention either attenuates or eliminates such and other problems and issues.

An object of the present invention is to provide easy access to electrical components stored underground in a secure and waterproof position when not in use. A particular object of the present invention is to provide a facile and readily accessible, recessable containment unit for mounting and manipulating an extendable wireless charging unit, such as an induction charging component employing an induction antenna. The present invention may be constructed with conventional, commercially available materials and construction/assembly methods. The enclosure is designed to make installation quick and easy, thus minimizing the time required for installation and ultimately cutting the cost to the consumer.

According to the present invention, an illustrated preferred embodiment of construction consists of four major assemblies: a containment unit 100, a tower 200, a power pylon 500, and module 600, 700. It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the claims in determining the full scope of the invention.

Containment Unit

Figure 1B:
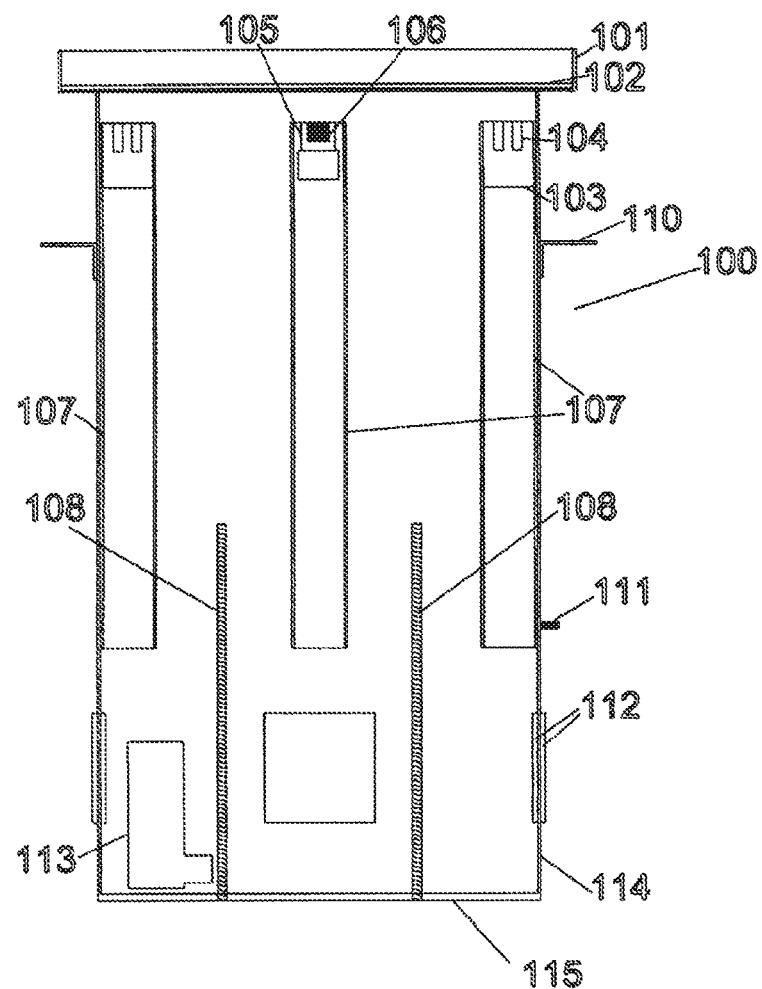
FIG. 1B is a plan view of the containment box.

A preferred embodiment of the present invention, as depicted in FIGS. 1A and 1B (showing the box from a side view (FIG. 1B) and an elevated view of the top (FIG. 1A), containment unit 100 is a water proof structure designed to house electrical connections that are made between line wires entering containment unit 100 through the conduit connection flats 112 and connecting to the power distribution blocks 513. Unit 100 consists of a circular base 115 with side walls 114 and an open top with crown 101. Containment unit 100 is made from readily available materials strong enough to maintain its shape under large loads, specifically, when installed underground the unit will have weight applied on the top, whether it be people, cars, trucks, aircraft or the like. Thus, the unit must be able to withstand pressure, weight and force. Containment unit 100 also provides the housing for tower 200 (FIG. 2) and all parts within tower 200. Crown 101 an inverted ring with a gasket 102 mounted on the horizontal surface to form the platform for cover 800 (FIG. 8) and upper connector block 300 (FIG. 3). Gasket 102 provides a water proof seal when the unit is in the closed position. The vertical edge of the crown 101 serves as the form for the finish grade for containment unit 100 when installed in concrete. The upper connector is secured to the crown using screws via screw holes or nut certs 109 that are positioned around the crown 101 to secure upper connector block 300 (FIG. 3).

Figure 5:
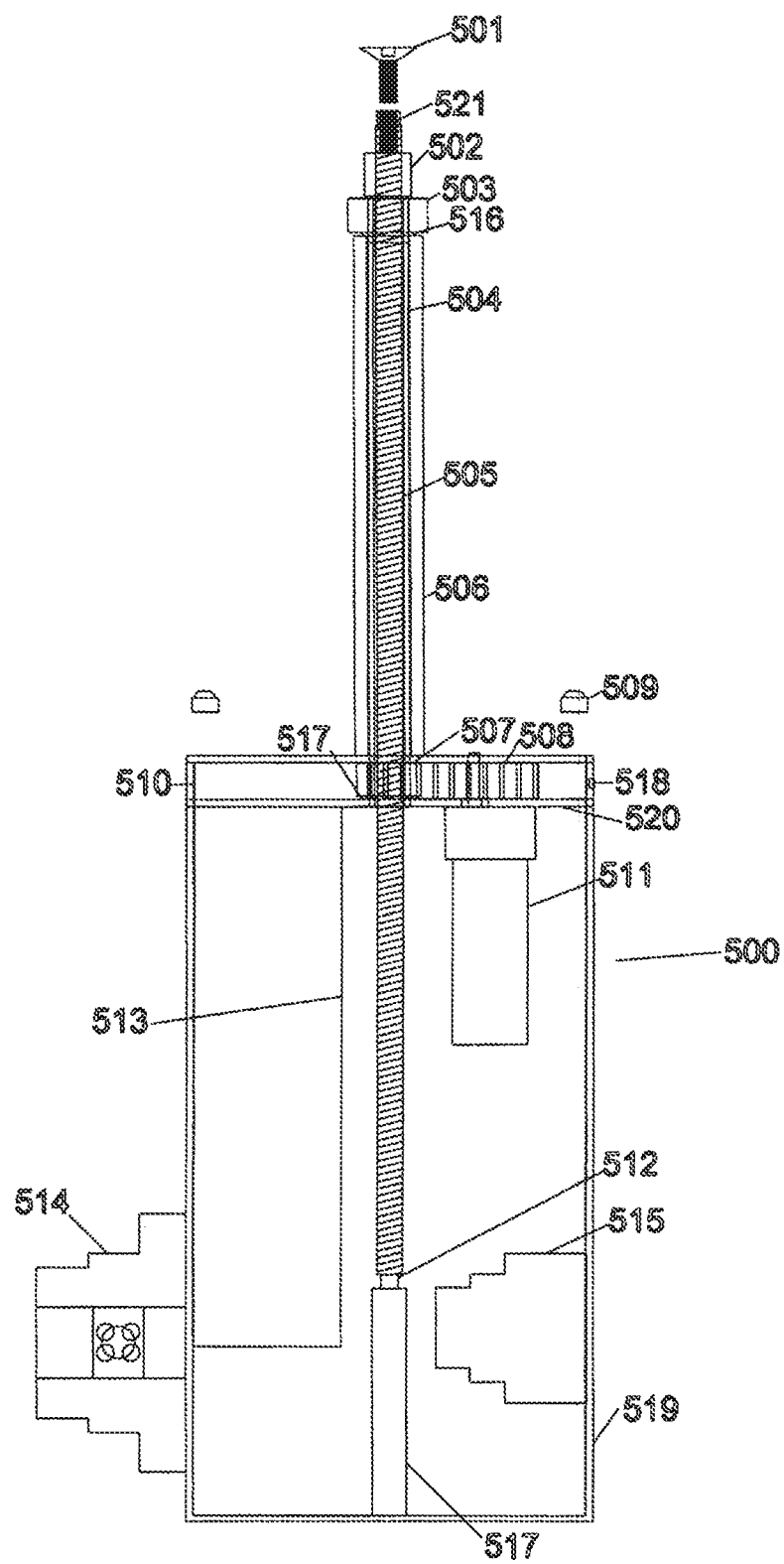
FIG. 5 is an elevated view of the power pylon of a preferred embodiment of the electrical supply apparatus of the present invention.

In FIG. 1 there are four wire ways 107 shown and these wire ways 107 are attached to the inside side walls in four places to protect wiring (not shown). In this embodiment one of wire ways 107 is left empty so as to provide an option for an installer to add data lines or communication lines. This is important that these lines be separated from the electrical lines as the electrical lines can interfere with the data lines. The remaining three wire ways 107 are used for electrical wiring for the device. Wire ways 107 serve as the mount for connector 103, containing pin receptacle 104, and low voltage (LV) connector 105, containing LV pin receptacle 106. These also serve as guide rails for the motion and movement of tower 200. Anchors 108 are attached to the base 115 of containment unit 100 to mount power pylon 500 (FIG. 5), when the unit is configured to be raised and lowered with a power unit. In this powered embodiment anchors 108 are threaded rods. Ground stud 111 is mounted to the side 114 of containment unit 100 and is there to ground the unit. A heater 113 may also be installed into containment unit 100 to prevent moisture in the containment unit 100. Conduit entry flat 112 is built into or attached to the side of containment unit 100 in order to attach incoming conduit to a round surface. Installation brackets 110 are installed to the outside of the side 114 of containment unit 100 to facilitate underground installation. As is known in prior art, in ground boxes are held in position via all thread attached to the rebar, used in a concrete pour. The all thread in turn is attached to the containment unit 100 by running the all thread through the hole in the installation brackets 110. The installation bracket 110 is sandwiched between two nuts, one above the bracket 110 and the other below. The nuts may be moved up or down on the all thread to level the containment unit 100 and particularly the upper edge of the crown 101 with the finish grade of the concrete pour.

The line wiring that is attached to the power distribution blocks (PDB) 514 passes through the wire ways 107 and connect to the pin receptacles 104 which are mounted in the receptacle 103 which are mounted to the top of the wire way 107. The low voltage connector 307 has several sources of wires. The wires may come from the low voltage transformer 513 directly. They may come through a Programmable Logic Control (PLC) 515 as control circuitry. Or as low voltage wiring coming in through the conduit entry flats 112 where they enter directly into the bottom of the wire way 107. They attach to pin receptacle 106 which is mounted in the connector 105 mounted at the top of the wire way 107. The wire ways 107 provide a protected passage for all wires from the bottom of the unit 100 to the top of the unit 100 and serve as a guide for the tower 200 as it moves up and down within the containment unit 100.

The high voltage and low voltage connections are made through their respective connectors. As the upper, first connector block 300 is installed on the crown 101 the connector 305 and its pins 306 and pins 304 and its connector mate 303 with the pin receptacles 106 and 104 which are mounted in their connector 105 and 103 which are mounted at the top of the wire way 107. The wire ways are mounted to the side wall 114 of the containment unit 100. Connector pins 306 and 304 are connected by the wires (not shown) that are molded in the first connector block 300 to the connector pins 308 and 302 respectively which are mounted in their connector 307 and 301 which are mounted in the upper, first connector block 300. Then as the tower 200 is moved to the full up position the pins 308 and 302 in the connector 307 and 301 which are mounted in the upper connector block 300 contacts the pin receptacles 404 and 402 which are mounted in their connector 403 and 401 which are mounted in the lower, second connector block 400 which is attached to the tower 200. From these pin receptacles 404 low voltage (LV) and 402 high voltage (HV) wires run to the various components mounted in the tower 200.

At the top of the containment enclosure 100 is the crown 101 which is an inverted ring. On the horizontal surface of the crown 101 is the gasket 102 that provides a watertight seal between the upper, first connector block 300 and the crown 101. The upper edge of the inverted ring that forms the crown 101 is the finish grade for the concrete if the unit is installed in the concrete.

Figure 2:
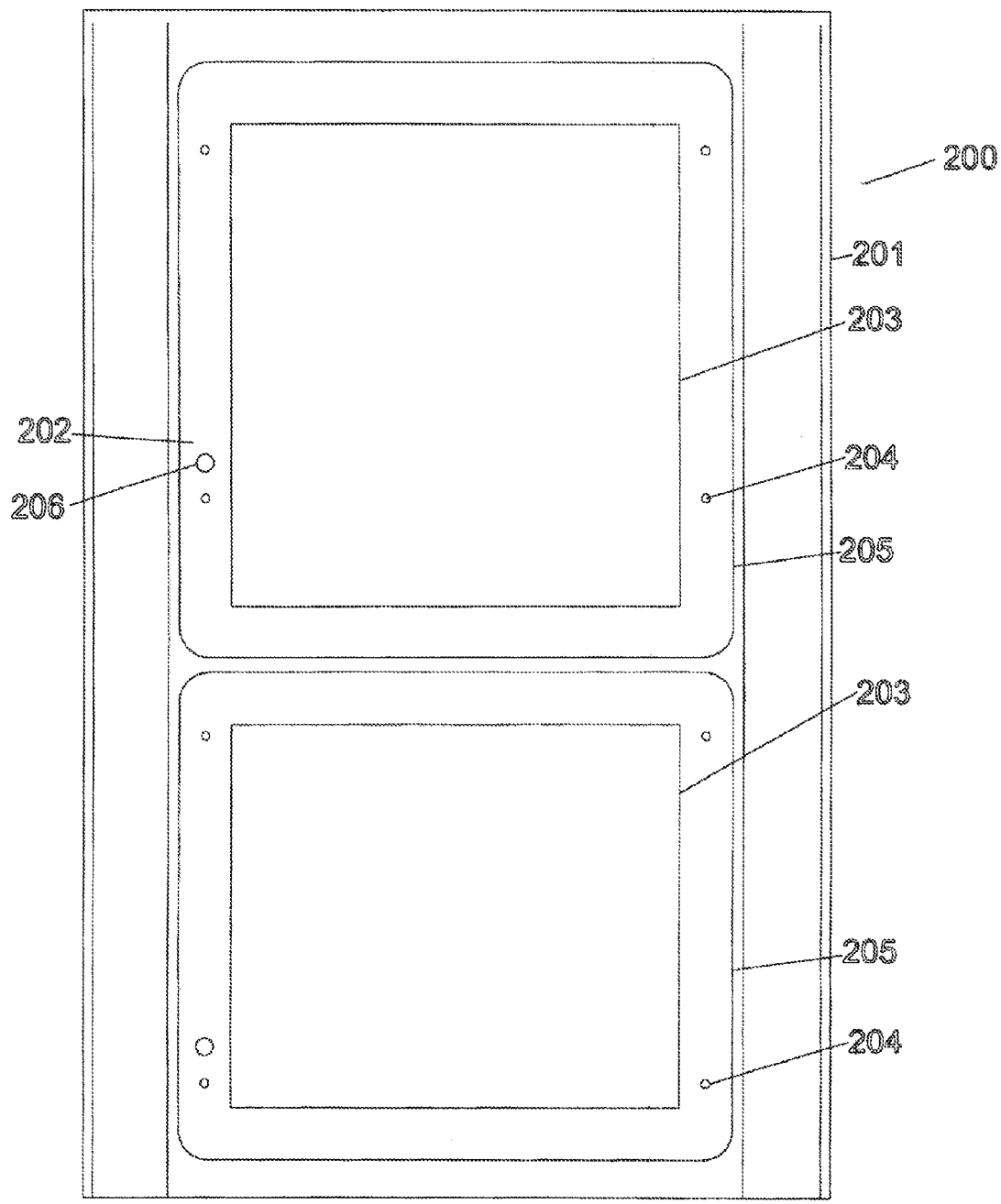
FIG. 2 is an elevated view of the tower of a preferred embodiment of the electrical supply apparatus of the present invention.
Figure 3A:
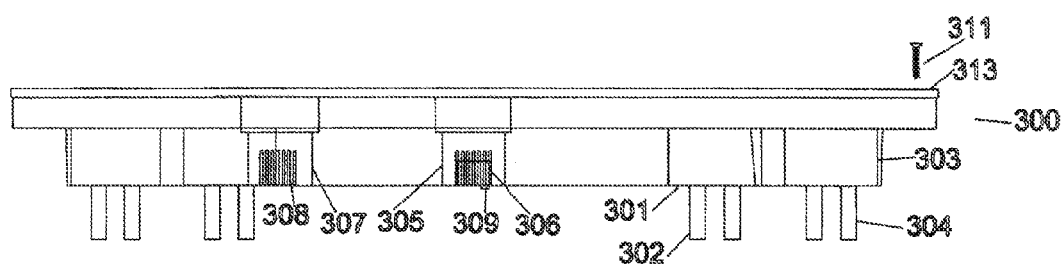
FIG. 3A is a plan view of the upper connector block of a preferred embodiment of the electrical supply apparatus of the present invention.
Figure 3B:
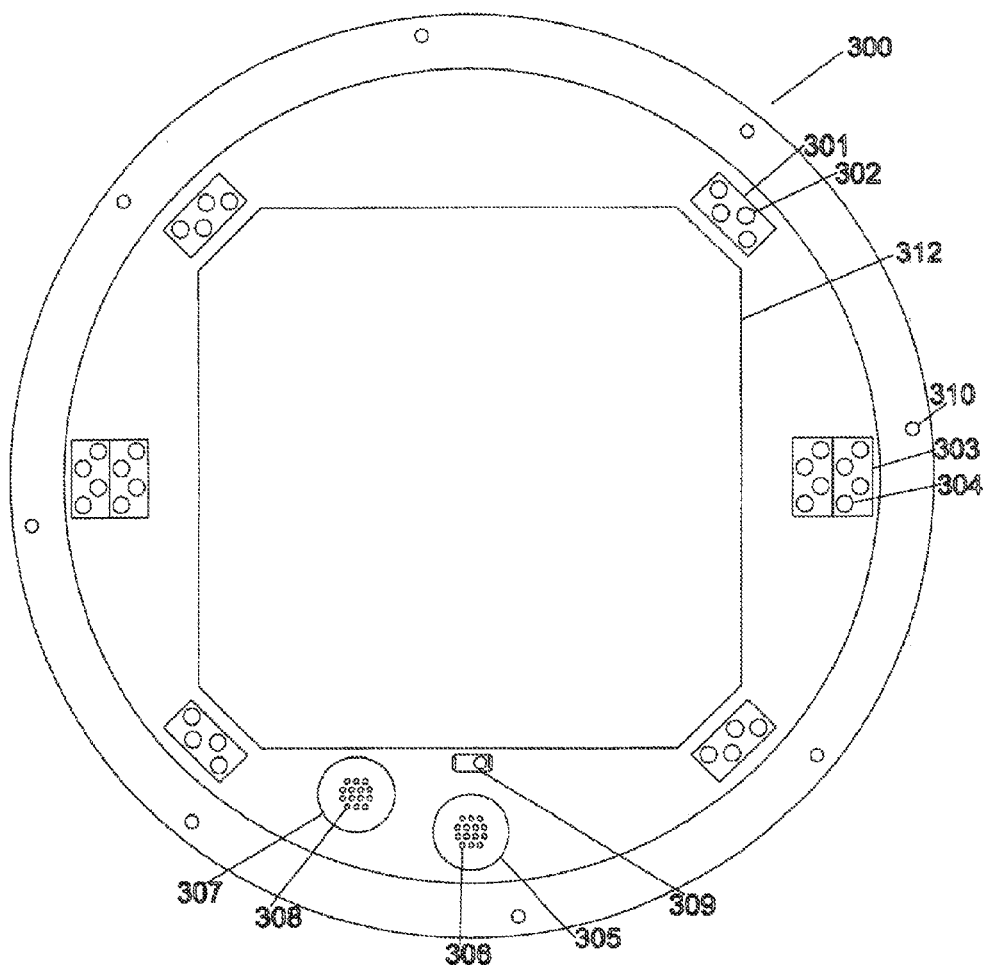
FIG. 3B is an elevated view of the upper connector block.
Figure 4A:
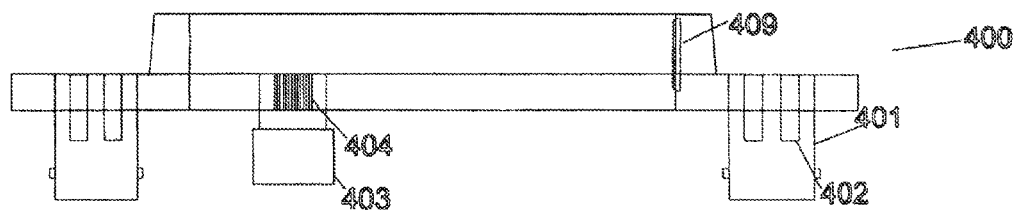
FIG. 4A is a plan view of the lower connector block.
Figure 4B:
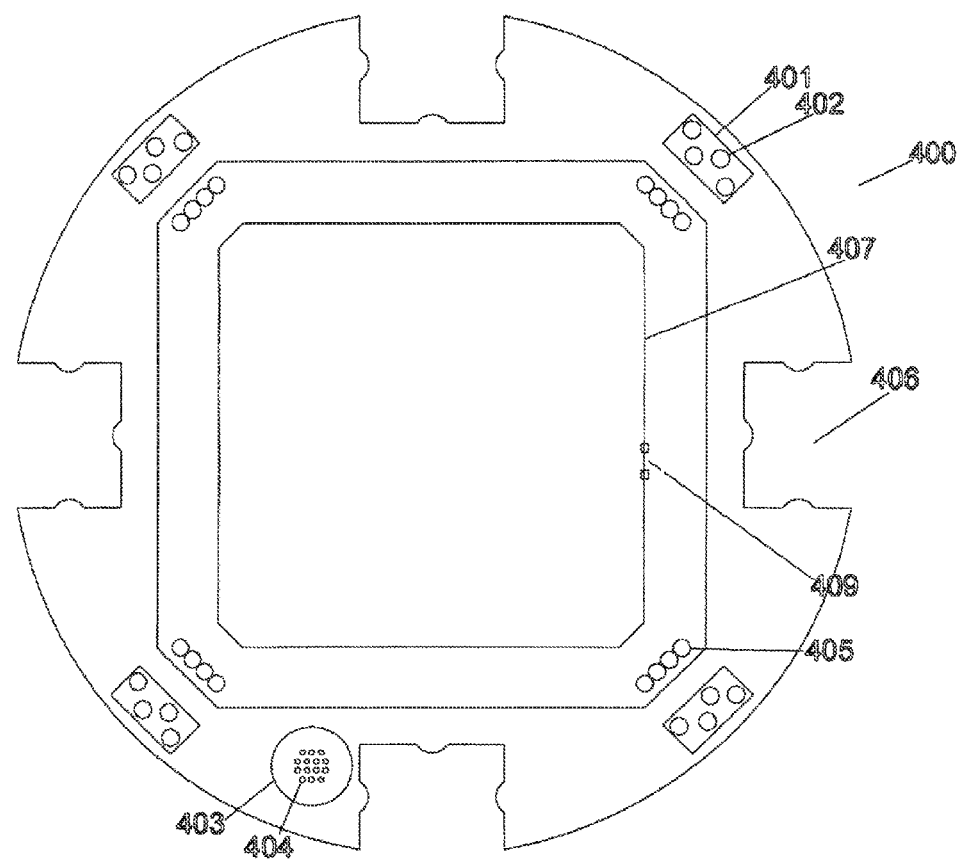
FIG. 4B is an elevated view of the lower connector block.

Second connector block 400 (FIG. 4) is attached permanently to the bottom of tower 200 (FIG. 2). The overall shape of lower connector block 400 will match the inside shape of containment unit 100 (FIG. 1), which in this embodiment is circular. Around the perimeter of lower, first connector block 400 is notch 406 which coincides with the position of wire way 107 in containment unit 100. The shape shown is to reduce surface friction. In the center of second connector block 400 is open space 407 for clearance of power pylon 500 (FIG. 5) mounted to the bottom of the containment unit 100.

Second connector block 400 (FIG. 4) has two thicknesses. The lower portion is made of material of sufficient strength and thickness to solidly mount the connectors of differing wires. The upper portion of the second connector block 400 is tapered on the outside edge to match the taper on the first connector block 300 (FIG. 3), forming a watertight joint when the tower 200 is in the full up position. Pass through 405 is made for wires (not shown) to go through lower connector block 400, from connectors 401 containing pin receptacle 402, and connector 403, containing low voltage pin receptacle 404, to inside tower 200 (FIG. 2). Pin 409 is installed in second connector block 400 in position to coincide with pin receptacle 519. Lower connector block 400 will also transfer any forces directed perpendicular to the motion of tower 200 (FIG. 2) into the surrounding containment unit 100 (FIG. 1). Lower connector block 400 will be attached to tower 200 using standard methods related to the materials used.

First connector block 300 (FIG. 3) upper portion is made to the general shape and size of crown 101 (FIG. 1) and secured by screw 311. The lower portion of the first connector block 300 is made to the same size and shape as the inner wall of the containment unit 100. Gasket 313 is installed to the top of upper connector block 300 to form a seal between the cover 200 and the first connector block 300. The opening 312 in the middle of the first connector block 300 is for a pass through for the tower 200. It is dimensioned such that it is approximately the same size as the outer size and shape of tower 200 (FIG. 2). The lower, thicker portion of the first connector block 300 is also tapered to match the upper portion of the second connector block 400 to form a watertight seal. The first connector block 300 should be made from materials with sufficient strength to not fracture when forces are applied from all directions.

First connector block 300 should also be constructed to an overall thickness to fully enclose connectors 301, 303, and low voltage connectors 305, 307. There should be no gap between first and second connector blocks 300, 400 when the tower 200 is in the full up position. It should be noted here that the first connector block needs to be between the cover 800 and the second connector block before 400 and 800 are attached to the tower. Connector 301 containing pin 302, and low voltage (LV) connector 307 containing LV pin 308, are mounted in the same position as the coinciding connector 401, 403 (FIG. 4) in second connector block 400. Switch 309 is mounted in upper connector block 300 as a limit switch to stop motor 511 (FIG. 5) when tower 200 is in the fully up position.

First connector block 300 has two thicknesses. The upper portion is made to the size and shape of crown 101 (FIG. 1). Thickness is determined by the thickness of cover 800 (FIG. 8.A) on tower 200 (FIG. 2). This allows cover 800 to be flush with the top of crown 101 when lowered and closed. The lower portion is made to the size and shape of containment unit 100. The outer edge of this lower section is the same size and angle as the inside edge of the inside of the containment unit 100. This fit allows the forces applied to the first connector block 300 to be transferred to the containment unit 100 and the surrounding area. This allows the unit to support more weight. First connector block 300 is mounted to containment unit 100 using matching screws 311 that attach to inserts 109. The lower portion extending into containment unit 100. Connector 303 containing pins 304, 305 containing Iv pin 306 match the position of the connector 103, 105 mounted in containment unit 100. There is a gasket 102 between the first connector block and the horizontal portion of the crown 101 for water tight fit.

Tower

Tower 200 (FIG. 2) is the second assembly of this first embodiment construction. Tower 200 is constructed with commonly used materials that are strong enough to provide structure and protection for all items installed within. The tower consists of a square structure with mitered corners, however, the design is not limited to a square tower as it could be round, rectangular, oblong, or any other design. A recess 205 is located on the side of tower 200 to provide a flush mount for the module and door. Within recess 205 is an opening 203 for the module 600, 700 to pass through when installed in the tower. The holes 204 are for mounting the module 600, 700 with screws 606, 607. Switch 202 is installed inside the tower, positioned in line with hole 206 so that the PLC 515 knows that the door is closed and it is safe to bring the tower down. A gasket 207 is installed to recess 205, to waterproof the module installation.

Cover 800 (FIG. 8) is attached to the top of tower 200 (FIG. 2). This is manufactured of materials of sufficient thickness and toughness to bear large loads without breakage or deformity. Molded into the perimeter of the cover 800 are LED lights 802 for visual identification when the tower is in the open position. The lights are turned on as a function of the first and second connector blocks 300 and 400 coming together as described above. When the tower is a power assisted apparatus, steps must be taken to prevent bodily injury when the tower is moving down to the closed position. Thus the need exists for a safety system.

In one embodiment of the present invention, the safety system consists of two separate rings and a secondary connector, which could be a sliding momentary connector. A first safety ring 801, and its counterpart second safety ring 803 are mounted around the perimeter of cover 800 where the first safety ring 801 is mounted solidly to the bottom of the cover 800. This first safety ring 801 is preferably a copper ring that is laid into a groove on an underside of the cover with a bottom side of the ring exposed to allow contact with the second safety ring 803 continuously about the entire 360 degrees circumference of the lid.

There are several methods to extend the tower 200 within containment unit 100. The tower 200 could be raised or lowered into the up and down positions manually, simply by lifting the tower up and locking it in place. Alternatively, the tower 200 could be lifted manually but with a mechanical assist, such as a spring, gas spring or other mechanical device to assist in raising the tower out of the containment unit. Finally, the tower 200 could be raised or lowered using a power assist. These embodiments are more fully described below.

Power Pylon

Power pylon 500 (FIG. 5) encompasses all the components for moving the tower 200 (FIG. 2) in and out of the containment unit 100. In this embodiment the raising and lowering motion is achieved through motor 511, gear box 510 and acme thread 505. Power pylon 500 is made from material with sufficient strength to withstand the forces from the raising and lowering of the tower from the containment unit 100. These forces can be both rotational and planar.

Gearbox 510 is mounted to the top of power pylon 500. The motor 511, is mounted to the bottom side of the gear box 510 and has sufficient horsepower and torque to raise and lower the tower 200 and all its components. The Acme thread 505 is installed through torque tube 504 Acme nut 502 and bushing 516 inside gearbox 510.

Shaft stabilizer 506 is attached to gear box 510 to support the acme nut 502, acme thread 505 and stabilizes the column. Torque tube 504 is installed over acme thread 505 inside shaft stabilizer 506. Torque tube collar 503 is attached to torque tube 504. Bushing 516a is installed between torque tube collar 503 and shaft stabilizer 506. Acme nut 502 is installed above torque tube collar 503 on torque tube 504. The end of acme thread 505 has an inner thread for attaching screw 501. The Acme thread 505 is attached to the cover 800 and drives the tower 200 in and out of the containment unit 100.

Power supply 513 is mounted to the inside wall of the power pylon 500. The power supply 513 receives input from incoming wires and converts that power from 110 volts to 12 volts. As the motor 511, Programmable Logic Control (PLC) and all the control circuitry and lights are low voltage we need to convert the power to 12 volts. Programmable logic control (PLC) 515 is also attached to the inside wall of power pylon 500. Switch 512 is attached to support 517 which is attached to the bottom of power pylon 500. This switch is the down limit switch that tells the PLC that the box is closed. Power distribution blocks 514 are attached to the inside wall of power pylon 500. Pin receptacle 518 is attached to the outside wall of power pylon 500. These pins are connected by wires to the first and second safety rings 801, 802 and connect the first and second safety rings 801, 802 to the receptacle that are attached to the PLC 515. This connection must be made in this way because in the preferred embodiment there is no power to the tower when the tower is in travel. These pins only connect when the tower 200 is within 1 inch of being fully closed. That way the safety rings 801, 802 are engaged for a short period of time. There is a detent near the top of the pins 409 so that the circuit is interrupted and the tower 200 may go all the way down into the containment unit 100. The power pylon 500 is held down to the bottom of the containment unit 100 with the use of the four (4) threaded rods anchor 108 at the base 115 of the containment unit 100. These rods are quite long so the attaching nut that hold the power pylon 500 in place can be attached at the top of the power pylon 500. Holes in both the bottom of power pylon 500 and gearbox 510 are placed to coincide with the position of anchor 108 (FIG. 1) on containment unit 100. In this embodiment power pylon 500 is secured by nut 509 screwed onto anchor 108.

Module

Figure 6A:
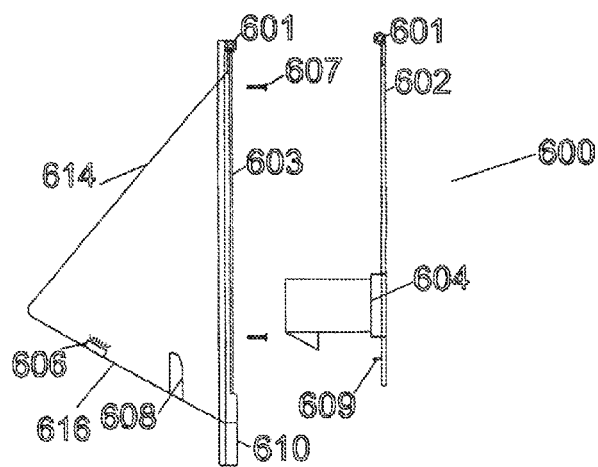
FIG. 6A is an elevated view of the sloped module of a preferred embodiment of the electrical supply apparatus of the present invention.
Figure 6B:
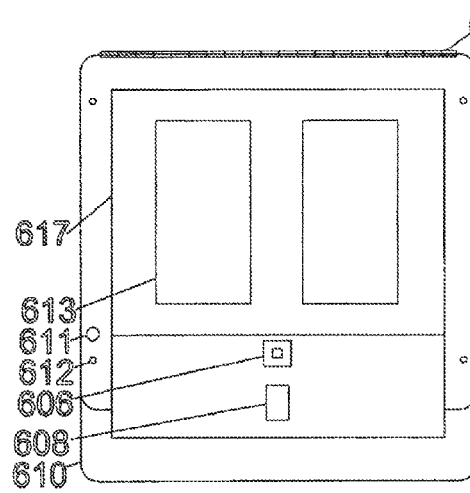
FIG. 6B is another elevated view of the sloped module.
Figure 6C:
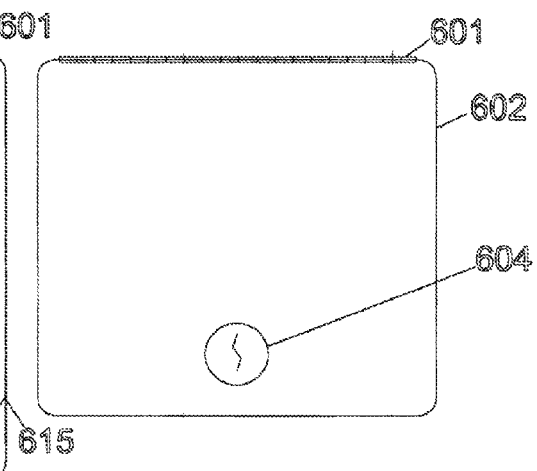
FIG. 6C is another elevated view of the sloped module.
Figure 7A:
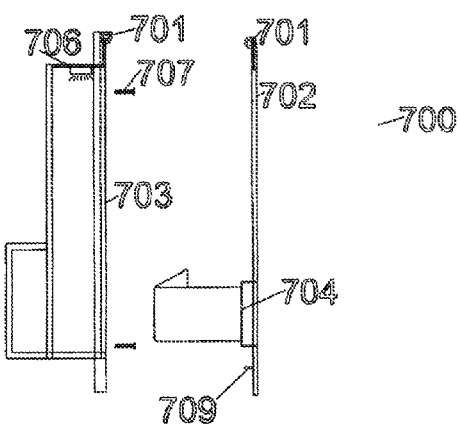
FIG. 7A is an elevated view of the flat module of a preferred embodiment of the electrical supply apparatus of the present invention.
Figure 7B:
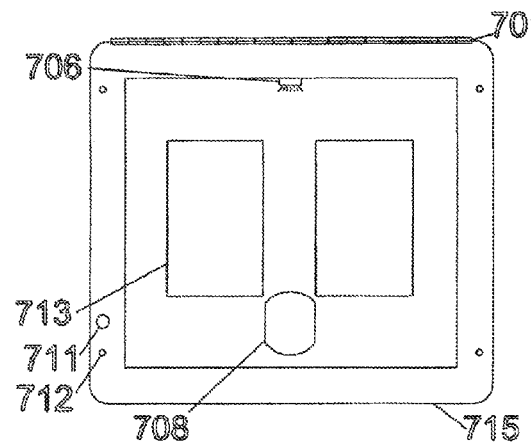
FIG. 7B is another elevated view of the flat module.
Figure 7C:
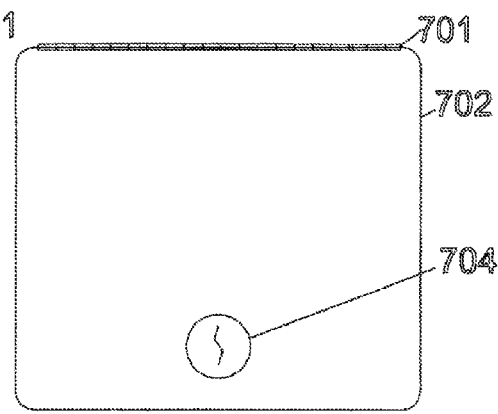
FIG. 7C is another elevated view of the flat module.
Figure 9:
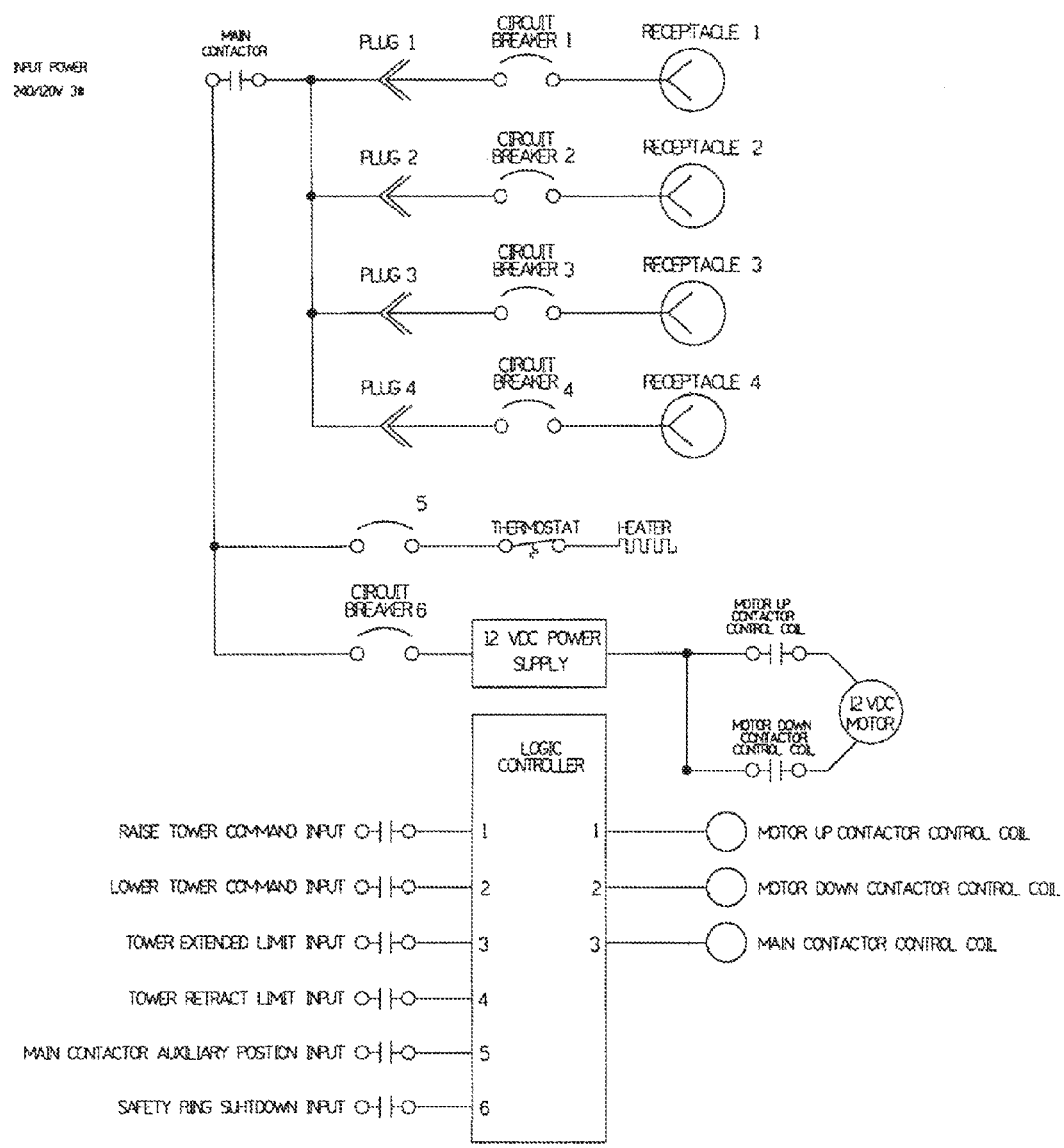
FIG. 9 is a schematic of the electronic controller of a preferred embodiment of the electrical supply apparatus of the present invention.
Figure 10:
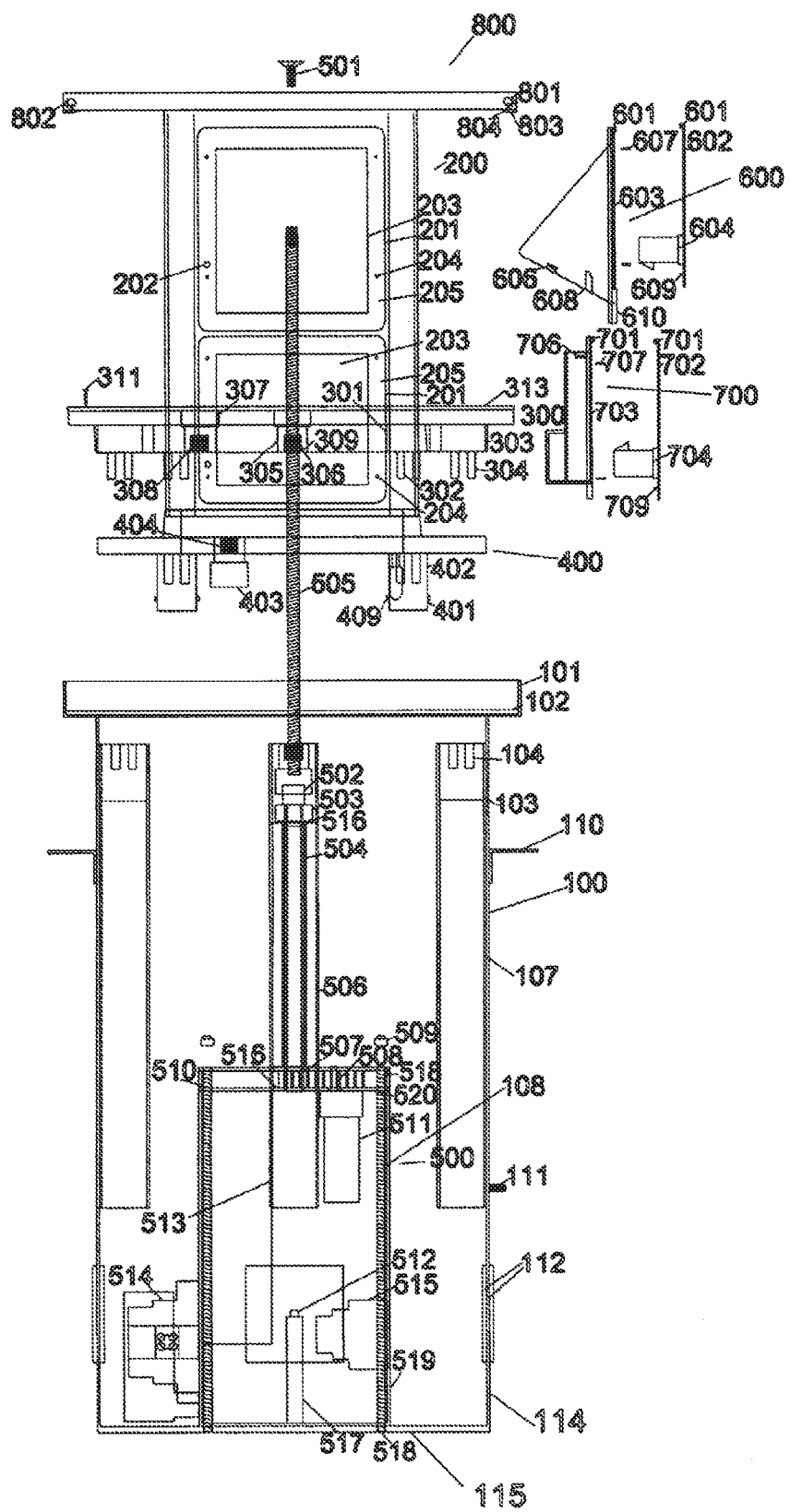
FIG. 10 is an elevated view of the complete electrical supply apparatus according to the present invention.
Figure 11A:
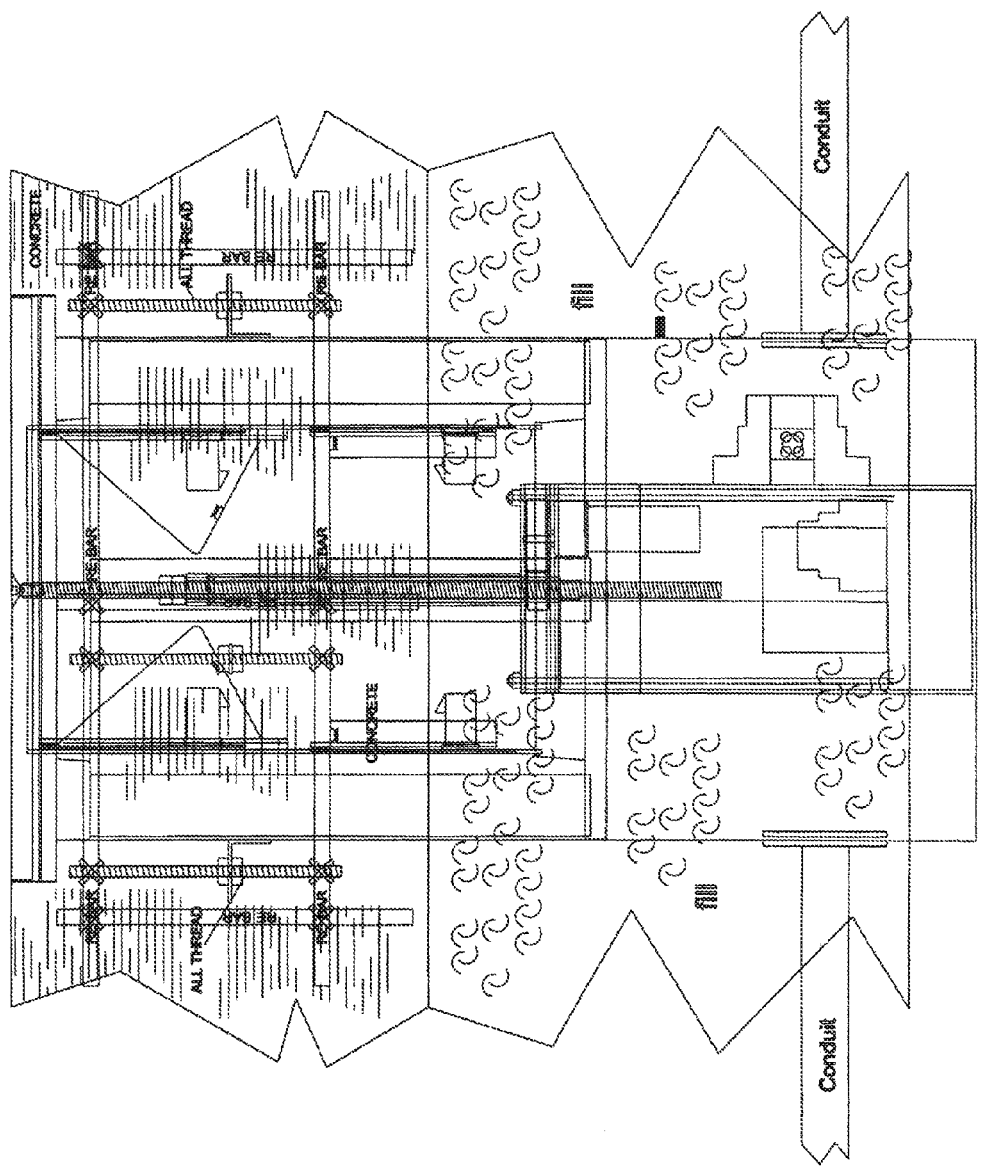
FIG. 11A is the complete electrical supply apparatus of the present invention fully enclosed in the standard art of concrete installation.
Figure 11B:
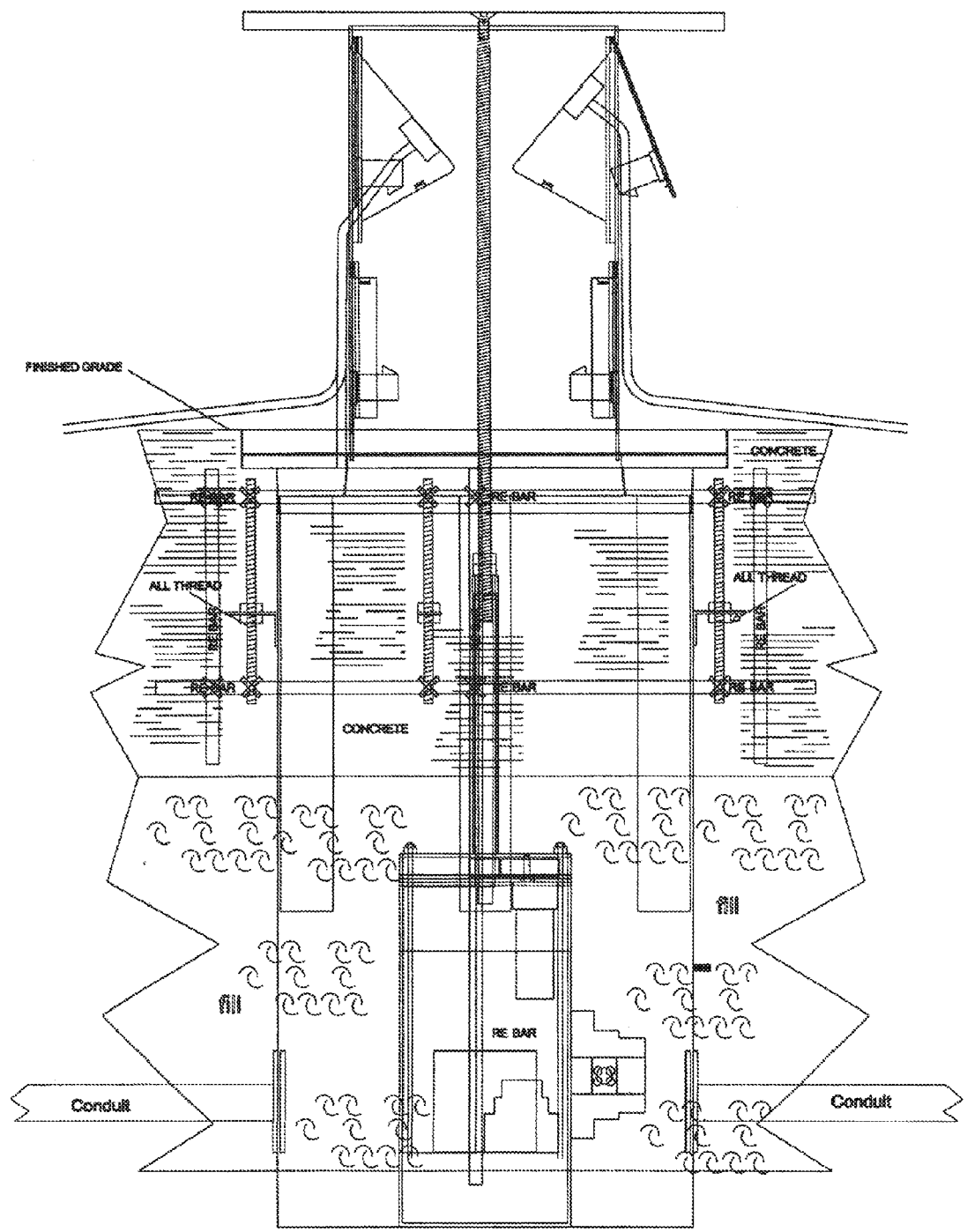
FIG. 11B is the apparatus in the standard installation with the tower fully open and cables attached in the modules.

Electrical components are installed in module 600, 700 (FIGS. 6 & 7) and then the module is installed into tower 200 (FIG. 2). Module 600, 700 is made from material with sufficient strength to support components of various shapes, sizes, and weight. FIG. 6 shows a sloped module 600 and FIG. 7 shows a flat module 700. Both ramifications have flange 615, 715 for mounting to tower 200. Door 602, 702 have lock 604, 704 installed to close and lock the component when the tower is up. This is to prevent inadvertent unplugging of connections and to keep water out of the component if there is a wash down when the tower 200 is up. Door 602, 702 is attached to module 600, 700 with hinge 601, 701. Door 602, 702 has pin 609, 709 on the closing side. When door 602, 702 is closed pin 609, 709 passes thru hole 611, 711 in flange 615, 715 to activate switch 202 (FIG. 2) on tower 200. The switch 202 serves a dual purpose in that it tells the PLC 515 that the door is closed and it is safe to retract the tower 200 and turn off the light 606, 706 in the module 600, 700. Light 606, 706 source is installed on the inside module 600, 700. Gasket 603, 703 applied to flange with sticky back tape or glue or some other approved method. Screw 607, 707 is used in hole 612, 712 to secure module 600, 700 to tower 200 (FIG. 2).

Catch 608 is installed on sloped module 600 for lock 604. It is positioned to close door 602 completely. Offset 610 is formed on flange 615 of module 600. Cutout 613 is positioned on hinge 601 side slope of module 600. Cutout 613 size and shape depend on the component being installed.

Flat module 700 has catch 708 which lock 704 passes through. Module 700 is the correct size for lock 704 to hold door 702 fully closed. Cutout 713 is positioned in module 700 opposite door 702. Cutout 713 size and shape varies for the component being installed.

There are other methods to raise and lower the tower 200, such as manually. This method would require some sort of latching system to hold the tower 200 down in the containment unit 100 and then to hold the tower in the full up position. A handle would be installed flush or otherwise into the cover. A locking mechanism would set once the tower was at the determined height and allow it to fall back into the closed position. A locking mechanism would then be engaged to lock the tower in place. The latching system would have to be sophisticated enough to be easily manipulated by the user.

Additionally, a gas spring can be put in place of the power pylon to push the tower out of the containment unit. A locking mechanism would then be engaged to lock the tower in place. A button or other actuator would be pushed to unlock the tower and operator would apply enough force to push the tower back into the containment unit.

A hydraulic or pneumatic cylinder can also be used to open and close the tower. A valve, switch, button etc. would activate the cylinder pushing the tower out of the containment unit. Reversing action would make the tower retract into the containment unit. Other various motion configurations can work with the same results, such as a scissor lift, rack and pinion, pulley, etc.

Operation

The manner of using the Electrical supply apparatus in this embodiment is to provide access to various electrical components. The electrical supply apparatus is installed in a manner sufficient to allow the tower to open and close above or flush with surface. Wiring is installed in the Pop-up apparatus through conduit entry points. Power is provided to the power distribution block. When the electrical supply apparatus is in the closed or down position the power is disconnected from the tower assembly. In the closed position the cover and crown are flush with surface installation.

To access the electrical components the operator activates a switch, either on the cover or via a wireless connection, thus activating the motor inside. The motor drives the tower to its full open, up position. This engages connections between the first and second connector blocks, providing power to the components. Components are accessed by opening the module door and plugging in the appropriate plug. The door can be closed and secured with lock while allowing sufficient space for cord clearance.

Upon completion of use, all plugs are removed and module door is closed. Switches inside the modules verify that the module doors are completely closed and secured before the motor can be activated to return tower to closed, or down position. A safety ring is provided along the underside of the cover. When activated the safety ring mechanism will reverse motor direction and will return tower to the full open position. The safety ring is activated if there is an obstruction between the cover and the crown during the closing process, and will reverse the motor so as to prevent injury. If there are no obstructions the tower will return to the closed position.

Description of Above Ground Mount Electric Car Charging Station.

The EV charging station (EVCS) is one above ground application of the pop-up apparatus that deserves expanding upon.

Installed on the pedestal will be the user verification system that could be a card reader that initializes the activation of the EV. This system could be a credit card reader, an ID reader, or any other system that would allow a qualified user access to the system. When the EV unit is activated by the consumer the tower will move up and out of the pedestal, carrying with it the charging cables and a retracting drum to which the cables are attached. After the tower is in the full open and up position the consumer can remove the cable from its seat. The user can then plug this into the receptacle on the EV. The computer interface between the car and the electric provider will connect and charge the battery. If during any time the connection is broken between the car and the EV unit, the unit will turn off and the cable or cables will be retracted by motor driven drums. When the cable is back in the seat the tower will automatically return to the closed position.

If the cable is released from the car prior to being finished with charging, it may not be plugged into that or another vehicle until the tower has been returned to the fully closed position and is then re-released into the up position again. This prevents the theft of power from one vehicle to another. Currently the connector available in the EV unit is the standard SAEJ1772 Combo Connector. With this connector the consumer will be able to quick charge or slow charge their vehicle.

All transactions will go through the network attached to the owner of the individual EVSE unit. In other words, the present application is only for the mechanical box and not for the software and operational software.

The electrical supply apparatus of the present invention solves a persisting problem in the EVCS industry due to the cables, electronics, keypad, keypad and screens exposed storage and resulting theft and vandalism. The cables are costly to replace and the wire value renders them vulnerable to theft. Thus, provision of the present invention pop up electrical apparatus of secured storage while also providing easy access to the cables addresses such and other drawbacks of the past industry problems.

In this embodiment the below ground containment box is alternatively employed as a pedestal above ground. This is accomplished by using a mounting flange that is attached to the ground with 4 bolts. These bolts are anchored in concrete by common method. The pedestal is constructed to withstand a vehicle impact without serious damage to its inner workings. The size of the pedestal should be large enough to be easily seen and tall enough to access a user validation, verification system, such as a card reader, and car charging cables without excess reaching or bending over. This will be approximately 40" tall when the tower is in the closed, or down position.

Figure 14:
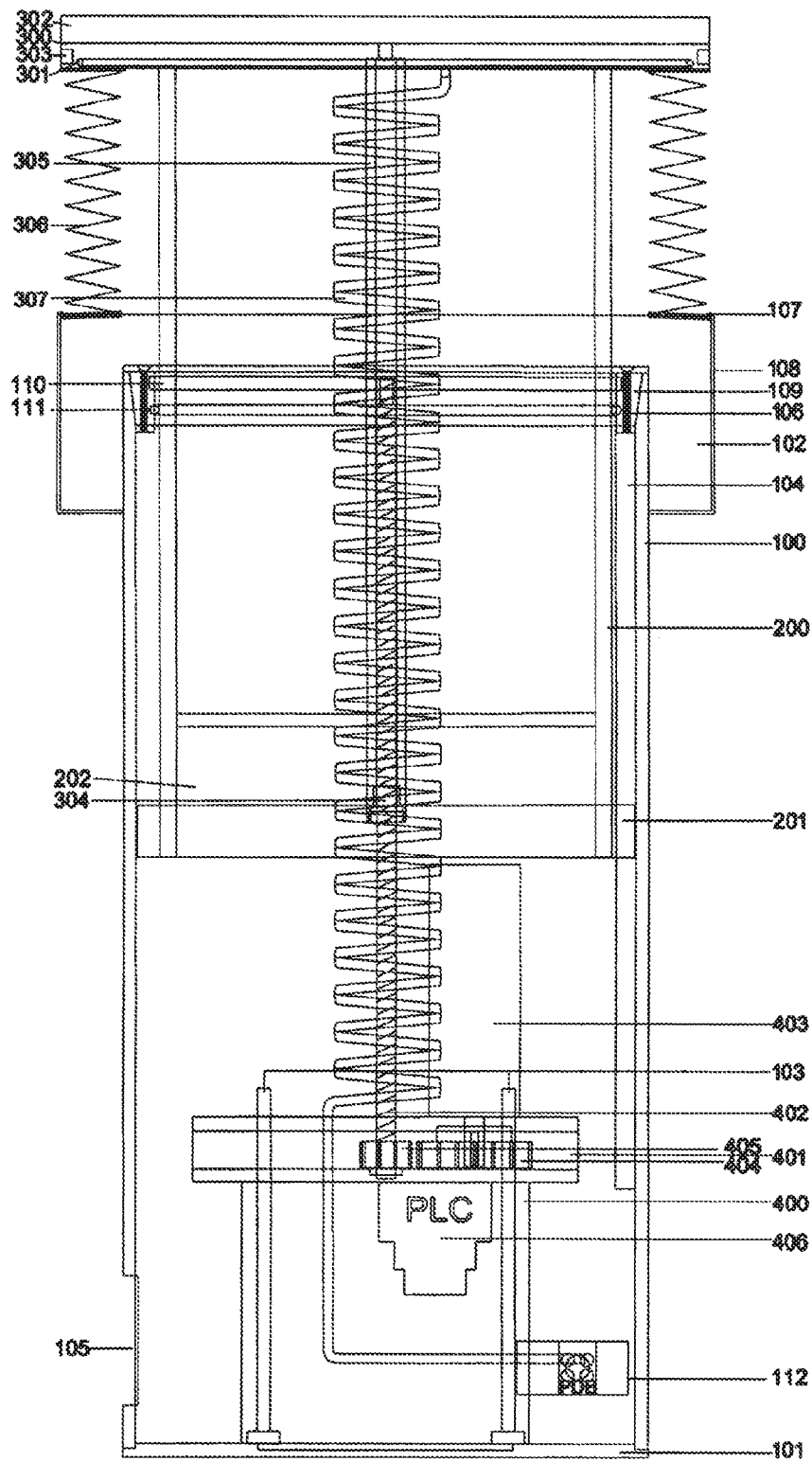
FIG. 14 is a side view of the preferred embodiment with the tower extended partially out of the containment unit, with the wireless charging component attached to the cover.
Figure 15:
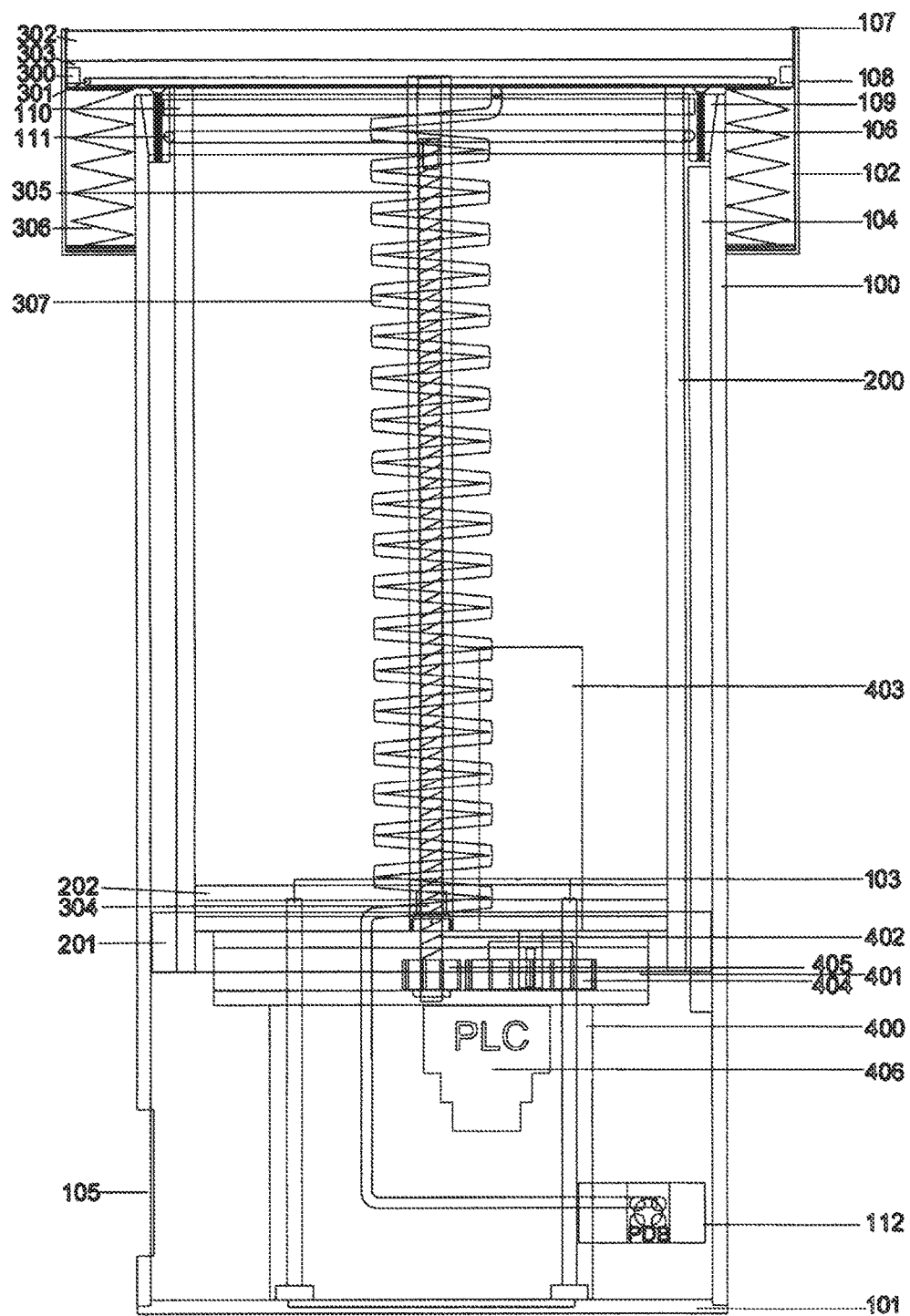
FIG. 15 is a plan view of the preferred embodiment with the tower retracted into the containment unit and the wireless charging component attached to the cover.

In an alternative preferred embodiment of containment unit as depicted in FIG. 14 containment unit 100 and extendable tower 200 are shown in a partially extended, position. Referring to FIG. 15, extendable tower 200 is shown the retracted position fully enclosed in the containment unit 100 with a wireless charging component 302 attached to said cover 300. Between cover 300 and containment unit 100 is a bellows 306 to prevent foreign matter from entering under the cover 200. Alternative embodiments of wireless charging 302 may be variously configured to adapt to particular electric vehicle models and receiving component configurations, including, for example, a flat plate, a dome, a column or cone and thus be curved, square, rectangular, and oval and thereby conform to the specifications or configurations of an electric vehicle or receiving component manufacturer.

Figure 20:
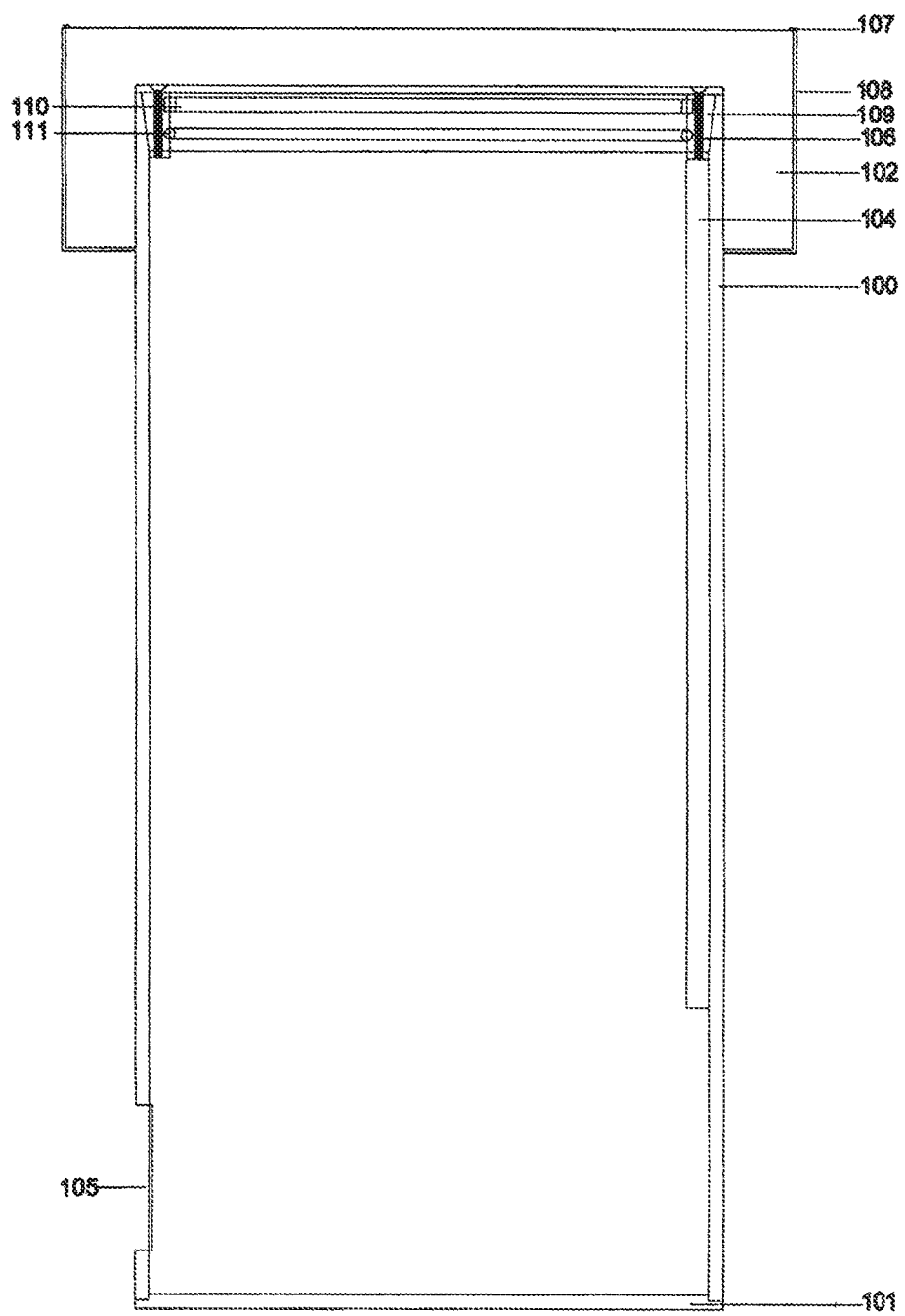
FIG. 20 is a side view of the containment unit with the tower removed.

Containment unit 100 FIG. 20 is a water proof structure designed to house electrical connections between the line wires entering through the conduit flat 105 in the sidewall of containment unit 100 which in turn are connected to the power distribution blocks 112. Preferred embodiments of this invention, as shown in the drawings, include an outer cylinder 100, a circular base 101 a circular tower 200 and a retainer ring 109 at the top of containment unit 100. Containment unit 100 and extendable tower 200 may be square, rectangular, oval or any configuration suitable for the purpose of this invention. Containment unit 100 is made from readily available materials of sufficient tensile strength and durability to maintain its shape under large loads, when installed underground or in a wall the unit will have weight applied to cover 300, whether it be people, cars, trucks, aircraft or the like. Thus, the containment unit must be able to withstand pressure, weight and force. Since the Containment unit 100 is watertight and weatherproof at all times it is the perfect place to house the extendable tower 200 power pylon 400 and all electronic, wireless transceivers and mechanical components (not shown) necessary to efficiently charge an EV.

Figure 16:
FIG. 16 is a side view of the retaining collar

Retainer ring 109 FIG. 16 is mounted at the upper rim of containment unit 100. Retainer ring 109 provides a water proof seal at top of the 100. Retainer ring 109 is secured to the top of containment unit 100 via screws 106 that are positioned around retainer ring 109. Extendable tower 200 passes through the center of retainer ring 109 which has two seals 111 and 112 that prevent water and other foreign mater from entering the box as extendable tower 200 moves in and out of containment unit 100.

In this flush to surface application of the pop up apparatus the containment unit 100, extendable tower 200 is the platform to mount a wireless charging component 302 to attain efficient wireless charging of electric vehicles. The extendable tower is able to extend out of the containment unit which is installed flush with a surface whether horizontal or vertical and adaptively, extend a wireless charging component 302 from flush with the surface in which it is installed to a proximity of less than 4 inches (10 cm) less than 1 inch (2.5 cm) all the way to the surface of an electric vehicle where a receiving component is located in order to efficiently and rapidly charge the battery of an electric vehicle. Retraction of the wireless charging component 302 and cover 300 to align the upper surface of the wireless charging component 302 with the upper rim flush with the surface in which it is installed providing hidden, secure stowage thereof.

The wireless charging component 302 is wired to the line voltage with coil wire to the distribution block 112. Containment unit 100 and extendable tower 200 are watertight and weatherproof, the electronics, controls, motor are thus well secured and protected from the elements when in all positions.

Tower

Figure 17:
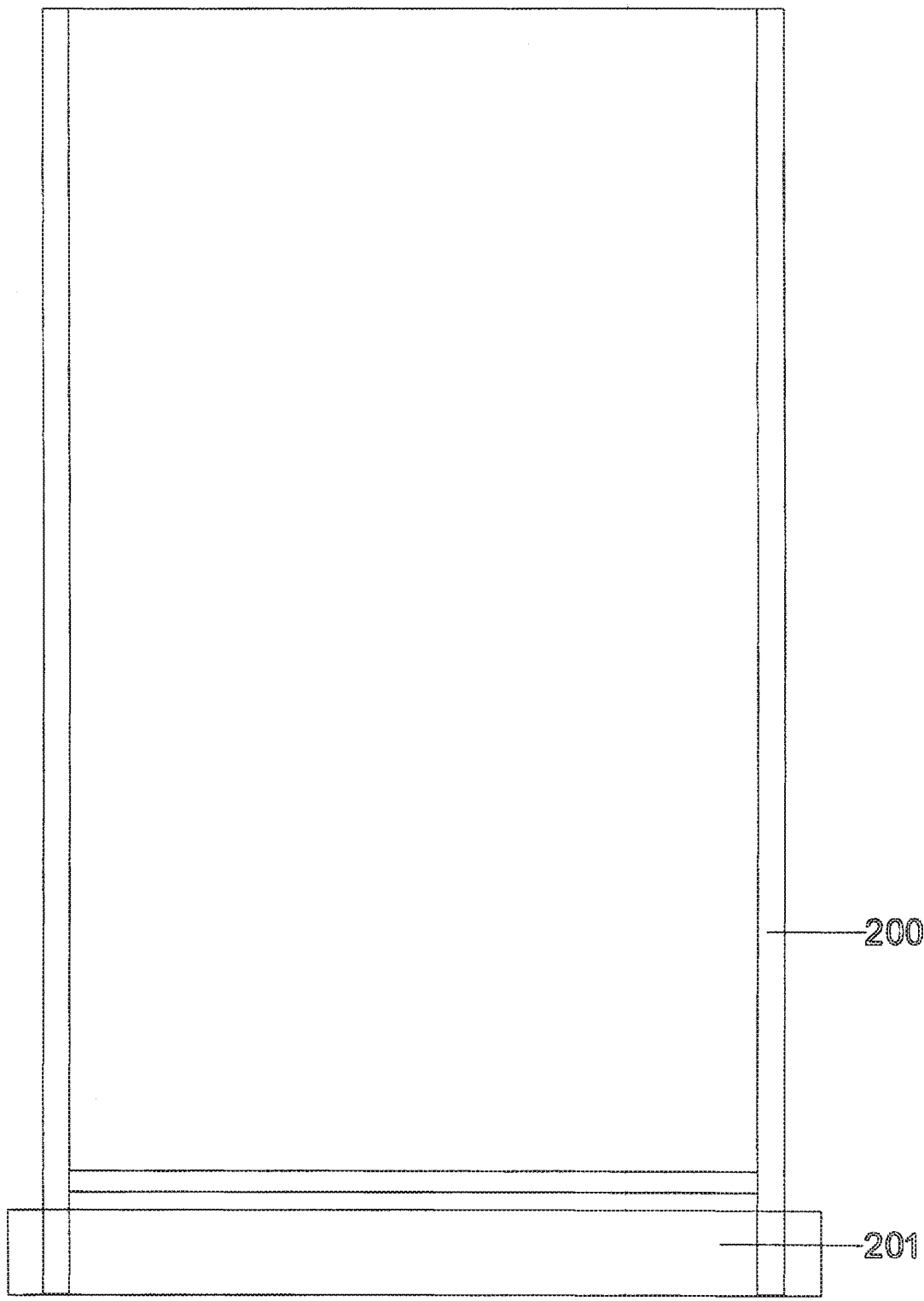
FIG. 17 is a side view of the tower, with all other components extracted from the electrical supply pop up apparatus and the cover removed of the present invention.

Tower 200 FIG. 17 presents a stable and strong structure upon which to mount wireless charging components. It is constructed with commercially available materials of sufficient tensile strength to provide structural integrity and protection for the unit installed and components stored within. Although the illustrated tower is a cylindrical configuration, it can be adapted to various alternative configurations, such as, for example, square, rectangular, oblong, or other shapes. In preferred embodiments, a heater is installed at the top of the tower to heat the cover to prevent freezing.

Cover

Figure 19:
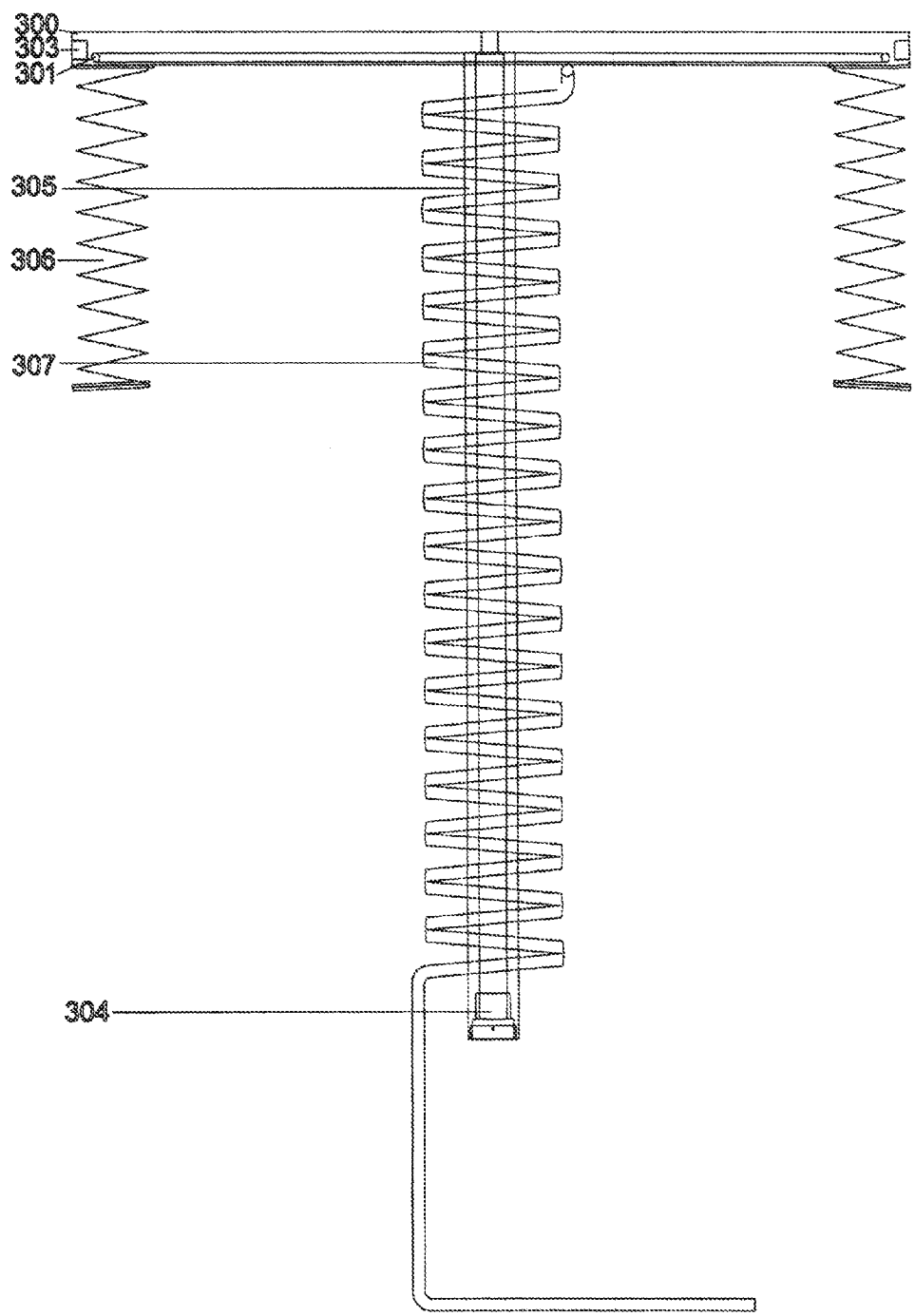
FIG. 19 is a side view of the cover showing the wireless charging component attached to the cover the coiled power supply wire for said component the bellows and the torque tube assembly and acme nut attached to the cover of the present invention.

Cover 300 FIG. 19 is attached to the top of the extendable tower 200 FIG. 17 and the wireless charging component 302 attached to cover 300. The Bellows 306 and the torque tube 305 are attached to the bottom side of the cover 300. At the bottom of the torque tube is the acme nut 304. The cover 200 is manufactured from materials of sufficient thickness and tensile strength to bear large loads without breakage or deformity. In particularly preferred embodiments, LED lights or other visual identifiers 303 for locating of the wireless charging component may be incorporated into the perimeter of cover 300.

Bellows

The bellows 306 FIGS. 14 and 19 is a rubber and fabric component that is flexible and weatherproof. The bellows 306 is manufactured in such a way as to make it so that it can extend for a long distance and yet contract to a very small package when retracted. The bellows 306 is attached to the bottom side of the tower cover 200 with a solid flange that holds it securely to the entire perimeter of the cover 300. It extends downward from the cover 300 to the crown 108. At the bottom edge of the bellows is a solid non flexible flange attached to the bellows as to form a rigid flange to hold the bottom of the bellow under the crown rim. At the top of the crown is a retainer 107 that keeps the bellow 306 from being pulled out of the crown 108. At the bottom or the crown 108 is the flange that is attached to the containment unit 100 and to the bottom of the crown 108. This flange forms the bottom of the bellows well 102. The well allows room for the bellows 306 to contract into when the tower 200 is retracted and in the closed position. The bellow 306 must float between the bottom of the bellows well 102 and the top of the crown 108. This seals the well and prevents water from entering the well 102 when the tower is extended. Because the bellows 306 is watertight there are several vents on the top flap bottom side to allow air to move in and out as the bellows 306 extends and contracts as the tower 200 and cover 300 extend and contract. The bellows 306 prevents water and other contaminants from getting under the cover which would thereby prevent the tower 200 from closing all the way and thereby not be flush with the surface.

Power Pylon

Figure 18:
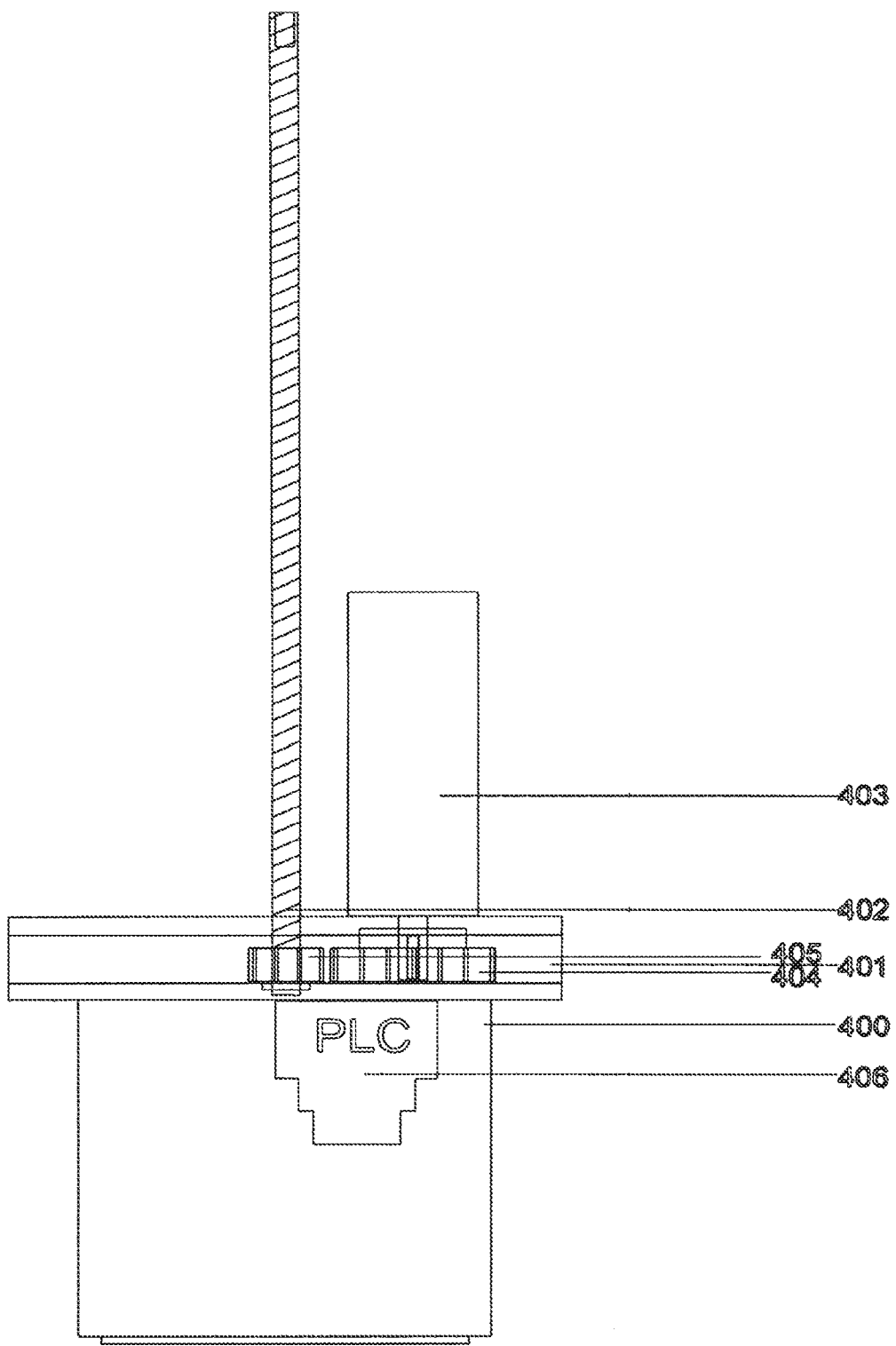
FIG. 18 is a side view of the power pylon.

Preferred embodiments of the present invention may further include power pylon 400 FIG. 18 which encompasses all the components for moving the tower 200 FIG. 19 in and out of the containment unit 100. In this embodiment the extension and retraction motion is achieved through motor 403, pulley housing 401 and acme thread 402. Power pylon 400 is made from material with sufficient strength to withstand the forces from the raising and lowering of the tower from the containment unit 100. These forces can be both rotational and planar.

Pulley Housing

Pulley housing 401 is mounted to the top of power pylon 400. Motor 403, is mounted to the top or bottom of the pulley housing 401 and has sufficient horsepower to raise and lower the tower 200 and all its components. Acme thread 402 is attached to pulley 405.

Since the charging method is wireless, identification of the electric vehicle to be charged and user of the pop up apparatus will only able to access said apparatus wirelessly. These wireless communication components will be safely stored in the watertight, weatherproof containment unit of the preferred embodiment of this invention.

The reader will see that the use of this embodiment of an electrical enclosure can be used to access electrical components easily in an either an above ground position or below ground application or in a wall or some other vertical surface. The enclosure can be easily secured and is able to meet visual and spatial restrictions. In addition, the enclosure is self-contained and parts cannot be lost or damaged when not in use. Furthermore, features can be added or removed according to customer directive. It should be noted that composition of the present invention may include various commercially available materials yielding suitable or equivalent tensile strength and suitable properties, such as steel, stainless steel, aluminum, plastic, nylon, composites or resins, wood, concrete, etc. Construction and assembly of the present invention employs known methods including, without limitation, welding, break forming, castings, molding, gluing, common fasteners etc. are standard methods of construction that can be used for making and assembling parts with equal results. Other embodiments, parts methods can be employed that are known in the industry that include but are not limited to the following.

The present invention includes numerous components which may be adapted and substituted with alternative components and mechanisms in accordance suited to a designated configuration or application. The extension mechanism can employ various commercially available devices employing mechanisms to exert a suitable motion which may comprise a scissor lift, rack and pinion, pulley, various gearing mechanisms, and other such systems. With respect to the acme thread, one or more threads may be used to accommodate the respective fit and application. Guides for the tower motion in and out of the containment unit can be separate parts from the conduit. A bearing may comprise a ball bearing or other type of glide installed into or below the tower, and may be provided in various shapes and configurations to correspond with a respective bearing or glide. Exemplary embodiments include employing wheels on the tower, spring rollers, rails or other movement means. The tower may be provided in a single unit or assemble able components. The tower opening may be configured and oriented in various diverse ways to adapt to the environment and application. For example, the opening may be round, square, triangular, elliptical. There can also be multiple towers oriented along a vertical, horizontal or various diagonal axes, in order to adapt to the configuration, size and application of the tower and module. Similarly, the cover of the present invention is adaptable to various configurations, orientations, and in preferred embodiments are associated visual identification markings such as, for example, bold colors, reflectors, lights or combinations and types of reflective paints of lights incorporated in or around such covers so long as their use does not compromise the structural integrity thereof.

In alternative embodiments, the cover of the present invention may be composed to incorporate materials to blend in with the surrounding environment. For example, the visible or upper surface of the cover may incorporate wood flooring, tile, carpet, or other material to provide a suitable aesthetic presentation and avoid an obtrusive unappealing look.

Further adaptable features of alternative embodiments of the present electrical supply apparatus include varying the configurations, sizes and orientations of components of the present invention to modify the tower extension and retraction rate and force. In addition, mounting brackets can be moved from the side to the base of the containment unit, and generally the size and shape of the containment unit and tower assembly can vary depending on number components and application.

Although the above description contains many exemplary details regarding alternative configurations and applications of the present invention, nothing therein should be construed as limiting embodiments but merely provide illustrations of different embodiments. Rather, the scope of the embodiments should be determined by the appended claims and their legal equivalents rather than the examples given.

What I claim is:

1. An electrical supply apparatus with a safety system comprising:
    a permanently installed, weatherproof containment unit, wherein the unit has
        a bottom;
        at least one side wall; and
        an open top defining an opening having engaged therein a retainer ring with two seals;
    a watertight extendable tower that has
        at least one side wall,
        a cover and,
        at least one electrical module installed in an extendable tower;
    wherein the extendable tower is extendable within the containment unit such that when said extendable tower is retracted in a closed position, said extendable tower is fully secured and enclosed within the containment unit and
    when said extendable tower is extended in a use position, the electrical module is accessible to a user, wherein power is available at the electrical module when the extendable tower is in the use position, and wherein the electrical module includes a means to secure and contain electric vehicle charging components so that said components are available to a user when said electrical supply apparatus is in said use position but are unavailable and secured away from said user when said electrical supply apparatus is in said stored position;
    a selectably elongatable bellows having a first end and a second end opposite the first end wherein the first end is engaged to the cover and the second end is engaged to the open top of the containment unit;
    wherein the seals provide waterproof slidable engagement between the containment unit and the extendable tower;
    further comprising at least one wireless charging component; and
    further comprising a heater adapted to heat the cover.

2. The electrical supply apparatus of claim 1, wherein said extendable tower is adapted to be moved manually between said stored and use positions.

3. The electrical supply apparatus of claim 1, further comprising a power assist operatively engaged with the extendable tower and adapted to move the extendable tower between said stored and use positions.

4. The electrical supply apparatus of claim 1, further comprising a user access adapted to qualify said user; and allow said user access to said electric vehicle charging components and electric power from said electrical supply apparatus after being qualified.

5. The electrical supply apparatus with a safety system of claim 1, wherein the wireless charging component is an induction antenna attached to the cover.

6. An electrical supply apparatus with a safety system comprising:
    a permanently installed, weatherproof containment unit, wherein said unit has
        a bottom,
        at least one side wall, and
        an open top defining an opening having engaged therein a retainer ring with two seals;
    an extendable tower that has
        at least one side wall,
        a cover and,
        a programmable logic control; and
        at least one electrical module installed in the extendable tower;
    wherein, said extendable tower is slideably extendable within said containment unit so that said extendable tower can be raised or lowered within said containment unit such that when said extendable tower is lowered and in a down position said extendable tower is fully secured and enclosed within said containment unit or said extendable tower can be raised to an up position so that said electrical module is accessible to a user; wherein power is available at said electrical module when said extendable tower is in said up position;
    wherein the seals provide waterproof slidable engagement between the containment unit and the extendable tower; and
    a bellows.

7. The electrical supply apparatus of claim 6,
wherein said electric supply apparatus can provide both low voltage and high voltage electricity; and
wherein the bellows is a selectably elongatable bellows having a first end and a second end opposite the first end wherein the first end is engaged to the cover and the second end is engaged to the open top of the containment unit.

8. The electrical supply apparatus of claim 7 further comprising at least one wireless charging component.

9. The electrical supply apparatus of claim 8 further comprising a heater adapted to heat the cover.

10. The electrical supply apparatus of claim 9, wherein said electrical supply apparatus further comprises: a means to secure and contain electric vehicle charging components so that said components are available to a user when said electrical supply apparatus is in said up position but are unavailable and secured when said electrical supply apparatus is in said down position.

11. The electrical supply apparatus of claim 9, further comprising a user access adapted to qualify said user; and allow said user to access said electric vehicle charging components and electric power from said electrical supply apparatus after being qualified.

12. The electrical supply apparatus of claim 9, further comprising a power assist, wherein a signal is sent to said programmable logic control to thereby move said tower.

13. The electrical supply apparatus of claim 8, wherein the wireless charging component is an induction antenna attached to the cover.

14. An electrical supply apparatus with a safety system comprising:
a permanently installed, weatherproof containment unit, wherein the unit has
  a bottom;
  at least one side wall; and
  an open top;
an extendable tower that has
  at least one side wall,
  a cover and,
  at least one electrical module installed in the extendable tower;
wherein the extendable tower is extendable within the containment unit such that when said extendable tower is retracted in a closed position, said extendable tower is fully secured and enclosed within the containment unit and
when said extendable tower is extended in a use position, the electrical module is accessible to a user, wherein power is available at the electrical module when the extendable tower is in the use position, and wherein the electrical module includes a means to secure and contain electric vehicle charging components so that said components are available to a user when said electrical supply apparatus is in said use position but are unavailable and secured away from said user when said electrical supply apparatus is in said stored position; and
wherein said extendable tower is moved via a power assist between said stored and use positions.

15. The electrical supply apparatus with a safety system of claim 14, further comprising at least one wireless charging component.

16. The electrical supply apparatus with a safety system of claim 15, wherein the wireless charging component is an induction antenna attached to the cover.

17. The electrical supply apparatus with a safety system of claim 16, further comprising:
a selectably elongatable bellows having a first end and a second end opposite the first end wherein the first end is engaged to the cover and the second end is engaged to the open top of the containment unit; and
a heater.

* * * * *